United States Patent
Do et al.

(10) Patent No.: US 10,965,802 B2
(45) Date of Patent: Mar. 30, 2021

(54) DEVICE MONITORING AND RESTRICTION SYSTEM AND METHOD

(71) Applicant: Avast Software s.r.o., Prague (CZ)

(72) Inventors: Juyong Do, Cupertino, CA (US); Rajarshi Gupta, Sunnyvale, CA (US)

(73) Assignee: Avast Software, s.r.o., Prague (CZ)

( * ) Notice: Subject to any disclaimer, the term of this patent is extended or adjusted under 35 U.S.C. 154(b) by 0 days.

(21) Appl. No.: 16/446,105

(22) Filed: Jun. 19, 2019

(65) Prior Publication Data
US 2020/0404093 A1 Dec. 24, 2020

(51) Int. Cl.
| | |
|---|---|
| H04M 3/00 | (2006.01) |
| H04M 1/72463 | (2021.01) |
| H04L 12/58 | (2006.01) |
| G06N 3/04 | (2006.01) |
| G10L 15/26 | (2006.01) |
| H04L 29/08 | (2006.01) |
| G06F 40/279 | (2020.01) |

(52) U.S. Cl.
CPC ...... *H04M 1/72463* (2021.01); *G06F 40/279* (2020.01); *G06N 3/049* (2013.01); *G10L 15/26* (2013.01); *H04L 51/12* (2013.01); *H04L 67/22* (2013.01); *H04L 51/32* (2013.01)

(58) Field of Classification Search
CPC . G10L 15/08; G10L 15/1815; G10L 15/1822; G10L 15/26; G10L 13/08; G10L 15/065; G10L 15/18; H04W 24/10; H04W 24/08; H04W 16/10; H04W 24/02; G06F 40/30
See application file for complete search history.

(56) References Cited

U.S. PATENT DOCUMENTS

| | | | |
|---|---|---|---|
| 8,893,053 B1 * | 11/2014 | Hyde et al. | |
| 2010/0169910 A1 | 7/2010 | Collins et al. | |
| 2013/0031353 A1 * | 1/2013 | Noro ............ | G06F 1/3212 713/100 |
| 2013/0150004 A1 | 6/2013 | Rosen | |
| 2013/0303143 A1 * | 11/2013 | Schrader ............ | H04W 4/023 455/418 |
| 2014/0344861 A1 | 11/2014 | Berner et al. | |
| 2015/0100887 A1 * | 4/2015 | Verkasalo | |

(Continued)

OTHER PUBLICATIONS

International Search Report dated Oct. 18, 2019 for PCT/US 2019052445.

(Continued)

*Primary Examiner* — Khalid W Shaheed
(74) *Attorney, Agent, or Firm* — Dovas Law, P.C.

(57) ABSTRACT

A method of controlling use of network-connectable devices is provided. The method includes monitoring by a first computational process, operating at a first processor utilization level, communication on a user device operated by a particular user and determining based on the monitoring by the first computational process a trigger event. The method further includes monitoring by a second computational process, operating at a second processor utilization level higher than the first processor utilization level, the communication on the user device responsive to determining the trigger event. Use of the user device is restricted based at least on the monitoring by the second computational process of the communication.

34 Claims, 14 Drawing Sheets

(56) References Cited

U.S. PATENT DOCUMENTS

| | | | |
|---|---|---|---|
| 2015/0351033 A1* | 12/2015 | Stanley-Marbell | ............................ H04W 52/0235 455/419 |
| 2016/0085773 A1* | 3/2016 | Chang et al. | |
| 2016/0173321 A1* | 6/2016 | Gukal | ................... H04L 41/064 709/224 |
| 2017/0041454 A1 | 2/2017 | Nicholls et al. | |
| 2017/0277796 A1 | 9/2017 | Kim | |
| 2019/0050710 A1 | 2/2019 | Wang et al. | |
| 2020/0065514 A1* | 2/2020 | Keen | ..................... G10L 19/018 |
| 2020/0104369 A1* | 4/2020 | Bellegarda | |

OTHER PUBLICATIONS

ParallelDot World Class AI Solutions at your fingertips, Breakthrough Research Papers and Models for Sentiment Analysis, https://blog.paralleldots.com/data-science/breakthrough-research-papers-and-models-for-sentiment-analysis/, accessed Apr. 23, 2019.

Jiwei Li, Minh-Thang Luong and Dan Jurafsky, 2015. A Hierarchical Neural Autoencoder for Paragraphs and Documents, arXiv:1506.01057v2.

Siwei Lai, Liheng Xu, Kang Liu, Jun Zhao, 2015. Recurrent Convolutional Neural Networks for Text Classification, Institute of Automation, Chinese Academy of Sciences, China.

* cited by examiner

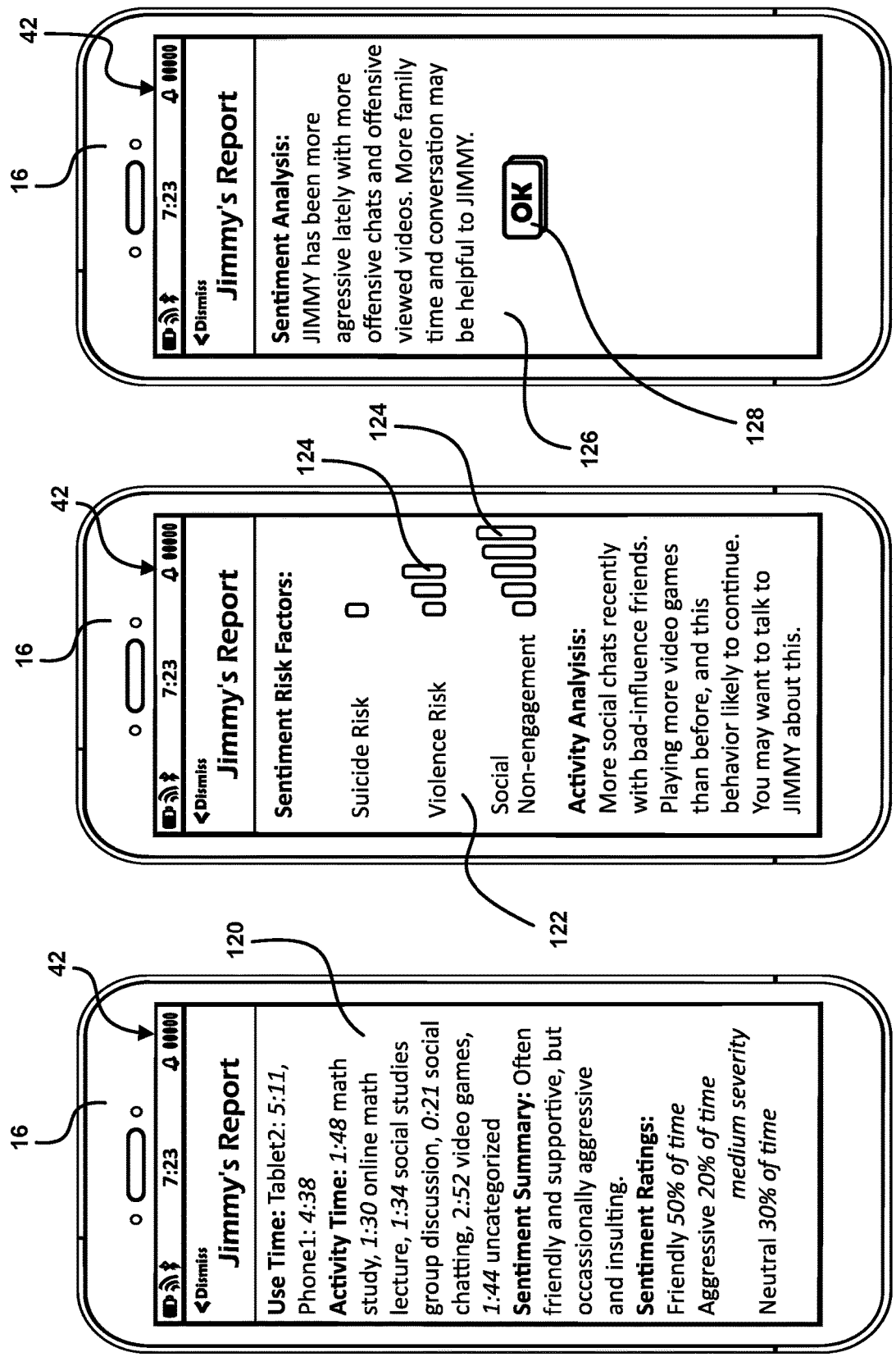

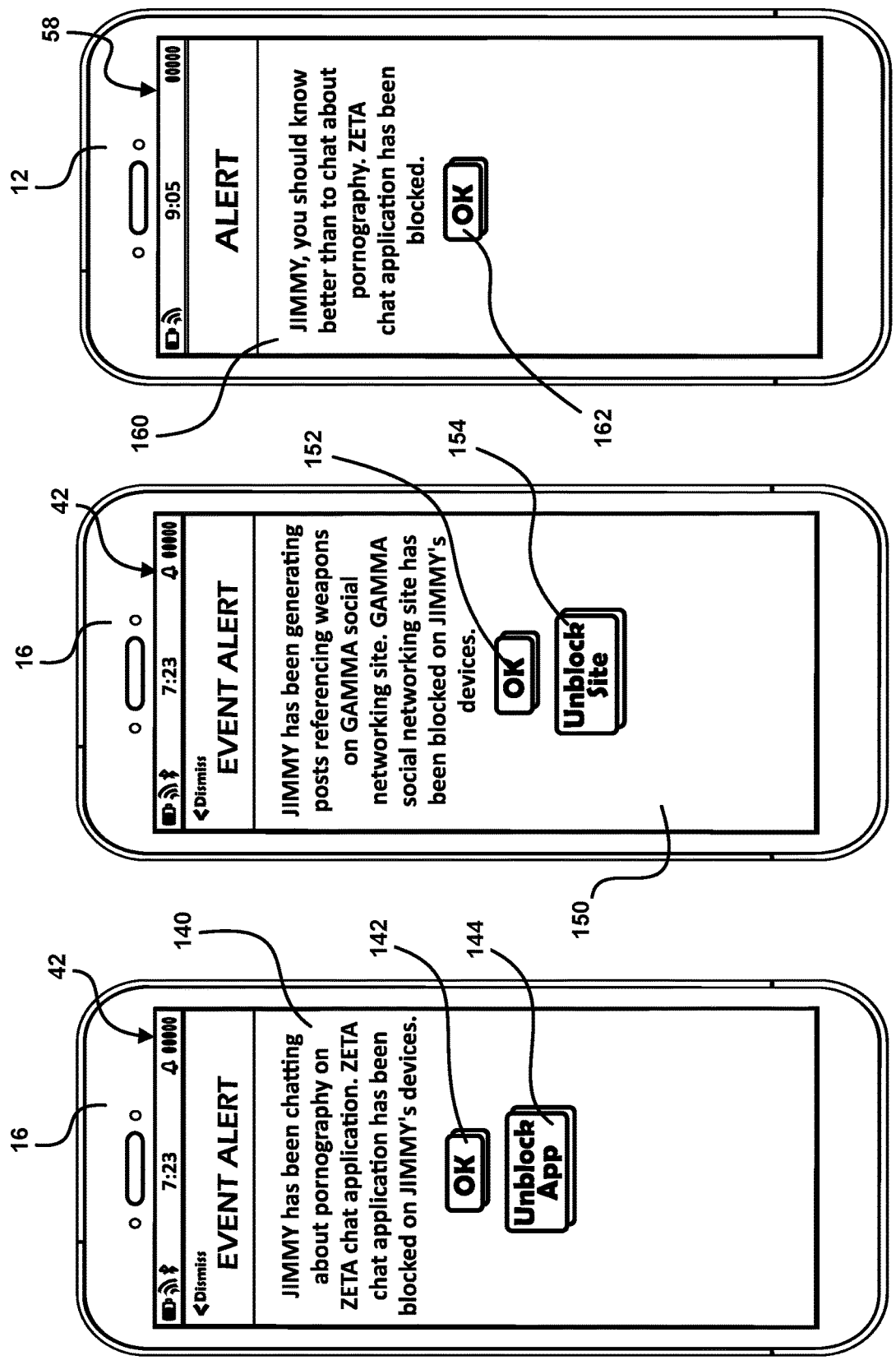

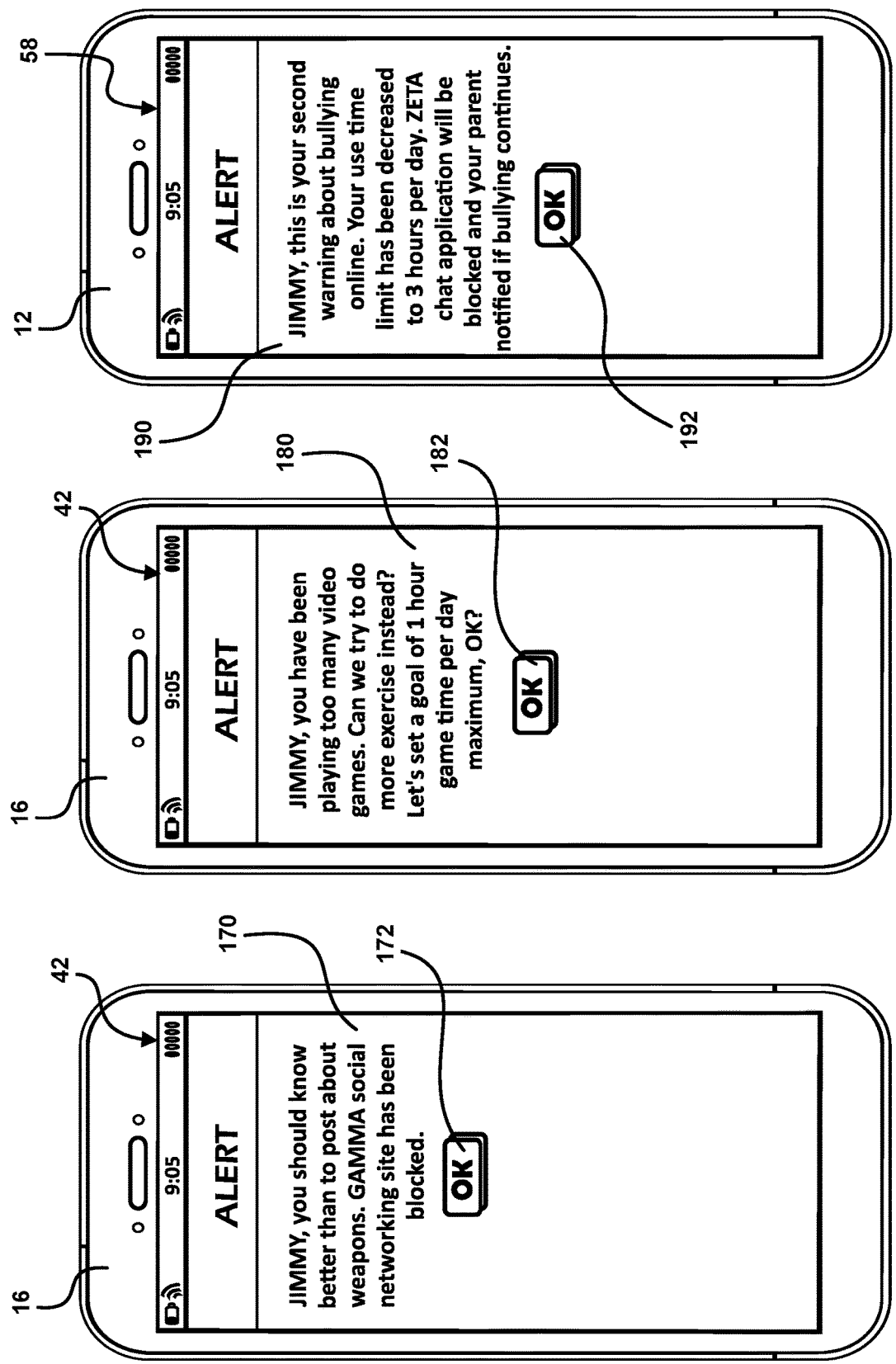

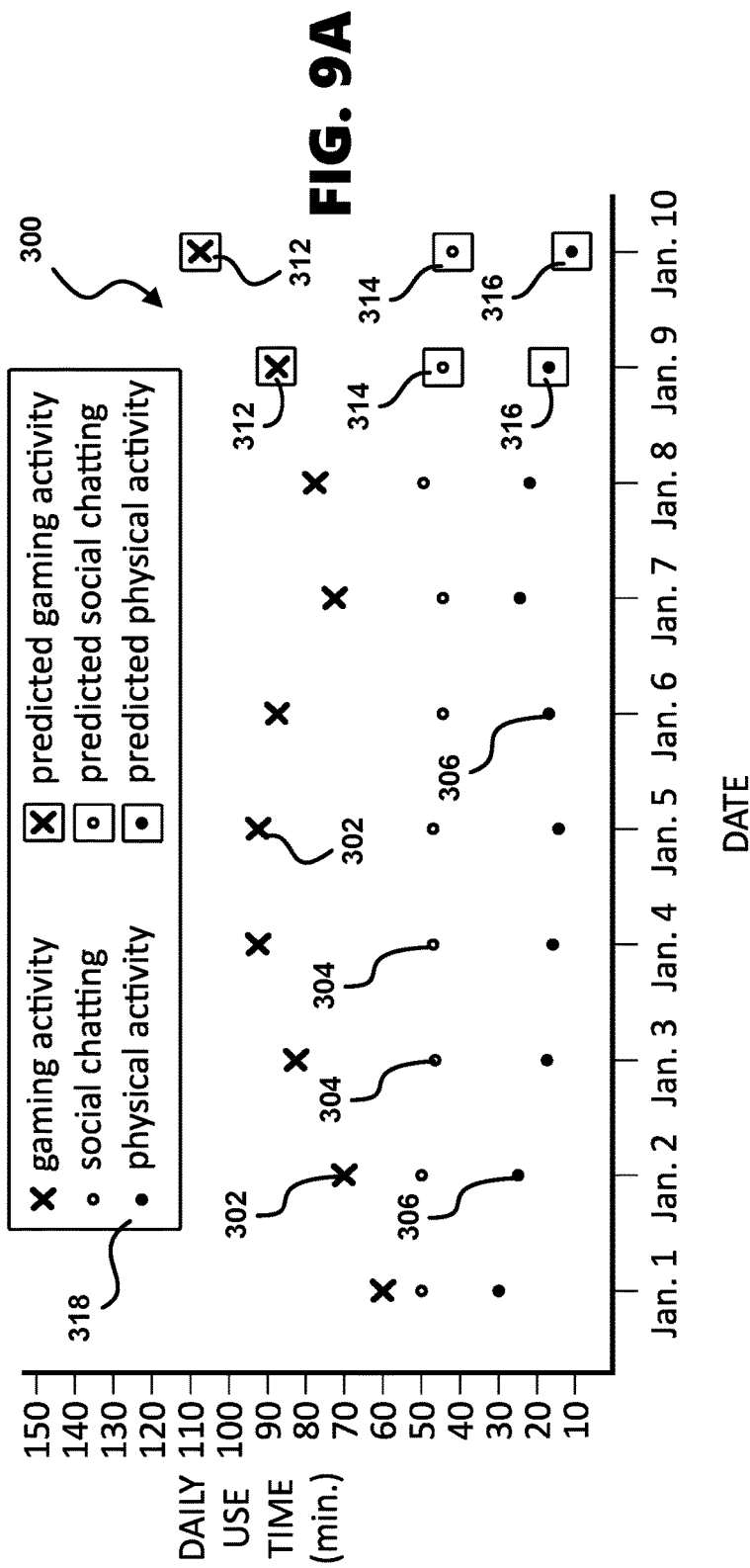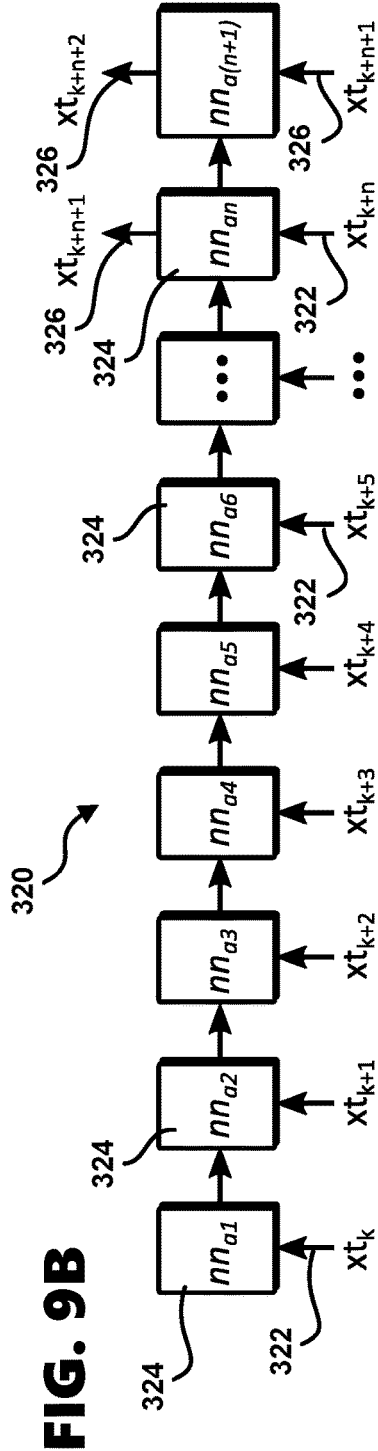

DEVICE MONITORING AND RESTRICTION SYSTEM AND METHOD

FIELD OF INVENTION

The invention relates generally to computing device control, and more particularly to restricting computing device use.

BACKGROUND

Parents often endeavor to limit the amount of time their children spend on various network-connectable computing devices including personal computers, tablets, cellular mobile devices, video game consoles, televisions, and electronic media players. Since network-connectable computing devices have become increasingly integral with a user's personal, academic and vocational life, it is not practical to arbitrarily preclude use of such devices. Concerned parents are often at a loss as to whether their child's use of a particular computing device is good and productive (e.g. group academic discussions) or objectionable (e.g. cyber bullying via a social media application). Monitoring such use is difficult and time consuming, and it is not necessarily practical to look over a child's shoulder while the child is using a computing device for example to view a chat window. Moreover, it may be desirable, especially for a teenage child, for the parent to respect a child's privacy and not be apprised of the specific details of their child's electronic communications.

SUMMARY

This Summary introduces simplified concepts that are further described below in the Detailed Description of Illustrative Embodiments. This Summary is not intended to identify key features or essential features of the claimed subject matter and is not intended to be used to limit the scope of the claimed subject matter.

A method of controlling use of network-connectable devices is provided. The method includes monitoring by a first computational process, operating at a first processor utilization level, communication on a user device operated by a particular user and determining based on the monitoring by the first computational process a trigger event. The method further includes monitoring by a second computational process, operating at a second processor utilization level higher than the first processor utilization level, the communication on the user device responsive to determining the trigger event. Use of the user device is restricted based at least on the monitoring by the second computational process of the communication.

Further provided is a method of controlling use of network-connectable devices including monitoring usage of a user device by a particular user, the usage including communication. Audio data or visual data of the communication is converted into text or images and activities of the particular user are categorized based on the text or the images. A change over time of the categorized activities of the particular user is determined, and use of the user device is restricted based on the determined change over time of the categorized activities.

Further provided is a method of controlling use of network-connectable devices including monitoring communication on a user device operated by a particular user, converting audio data or visual data of the communication into text, determining a sentiment of the particular user based on the text, and determining a change over time of the sentiment of the particular user. Use of the user device is restricted based on the determined change over time of the sentiment.

BRIEF DESCRIPTION OF THE DRAWING(S)

A more detailed understanding may be had from the following description, given by way of example with the accompanying drawings. The Figures in the drawings and the detailed description are examples. The Figures and the detailed description are not to be considered limiting and other examples are possible. Like reference numerals in the Figures indicate like elements wherein:

FIGS. 3A-3C show example interactive displays for providing reports to a supervisory user regarding controlled computing devices.

FIGS. 4A-4B show example interactive displays for providing alerts to a supervisory user regarding controlled computing devices.

FIGS. 5A-5D show example interactive displays for providing alerts to a supervised user regarding controlled computing devices.

FIG. 9A a plot chart showing example determined use time and predicted use time of a supervised user performing particular activities over a number of days.

FIG. 9B is a diagram figuratively showing an estimator in the form of an artificial neural network for predicting use time of a supervised user.

Figure 10:
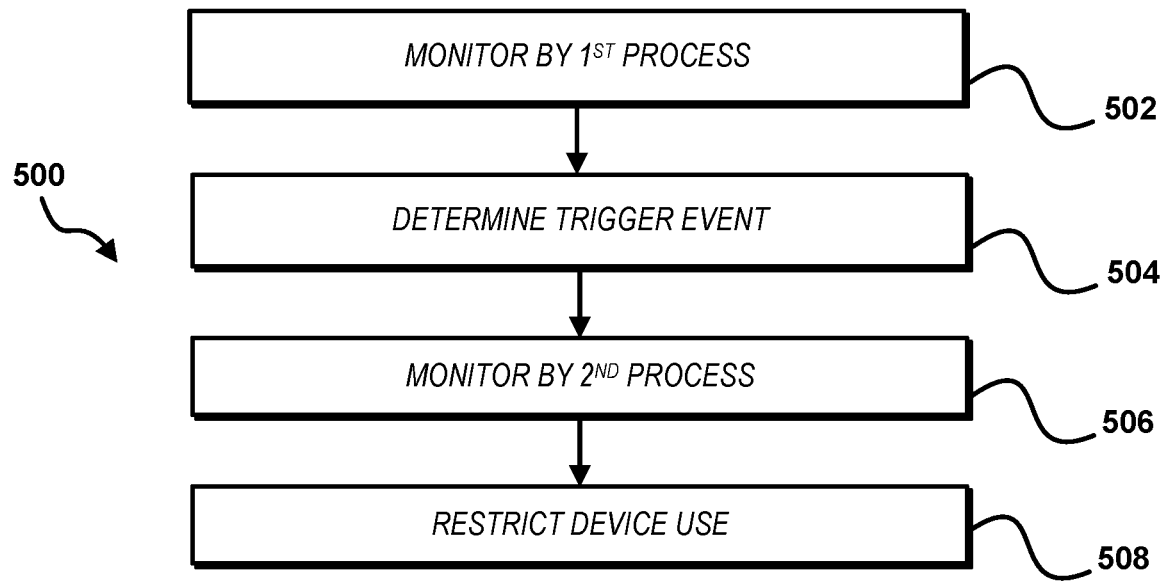
Figure 11:
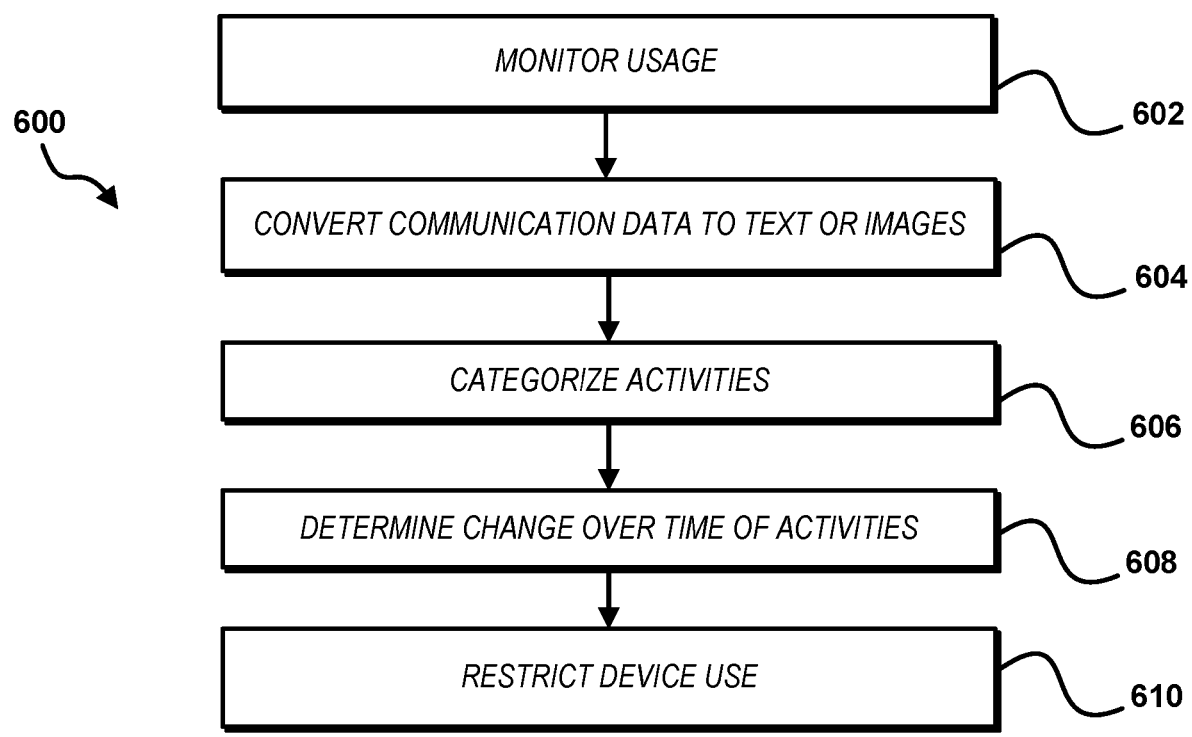
Figure 12:
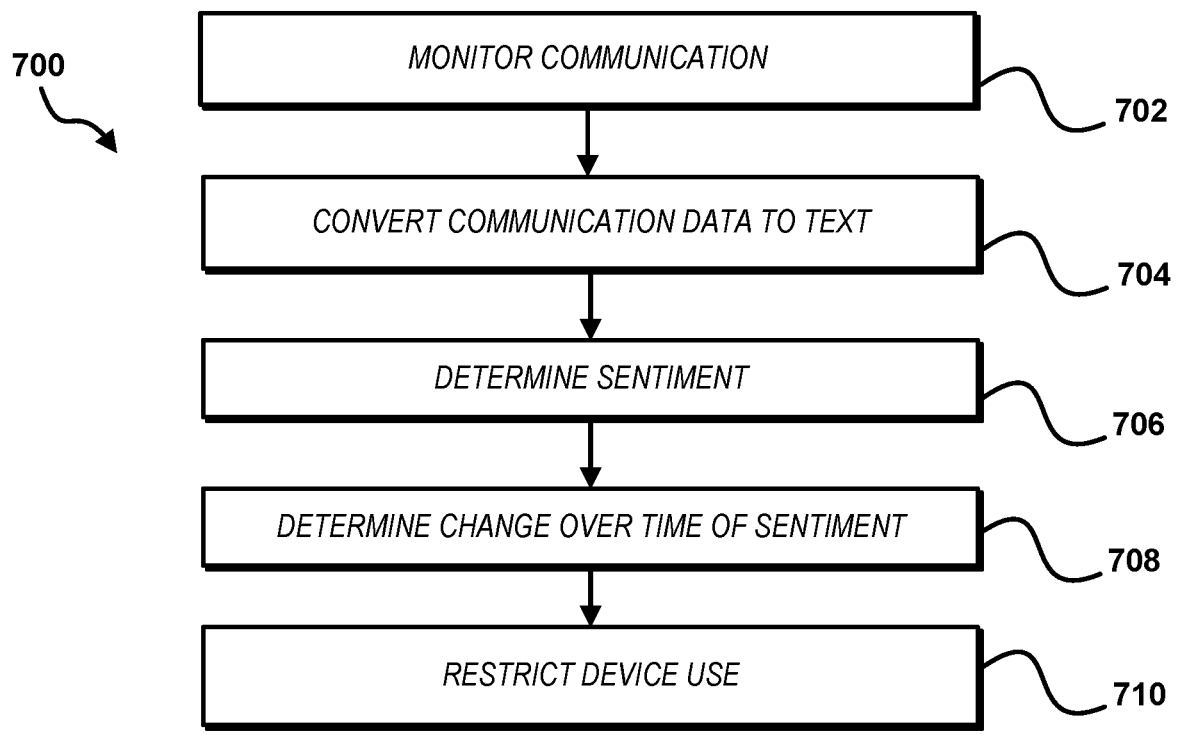

FIGS. 10-12 are flow charts showing methods for controlling computing devices based on computing device use.

Figure 13:
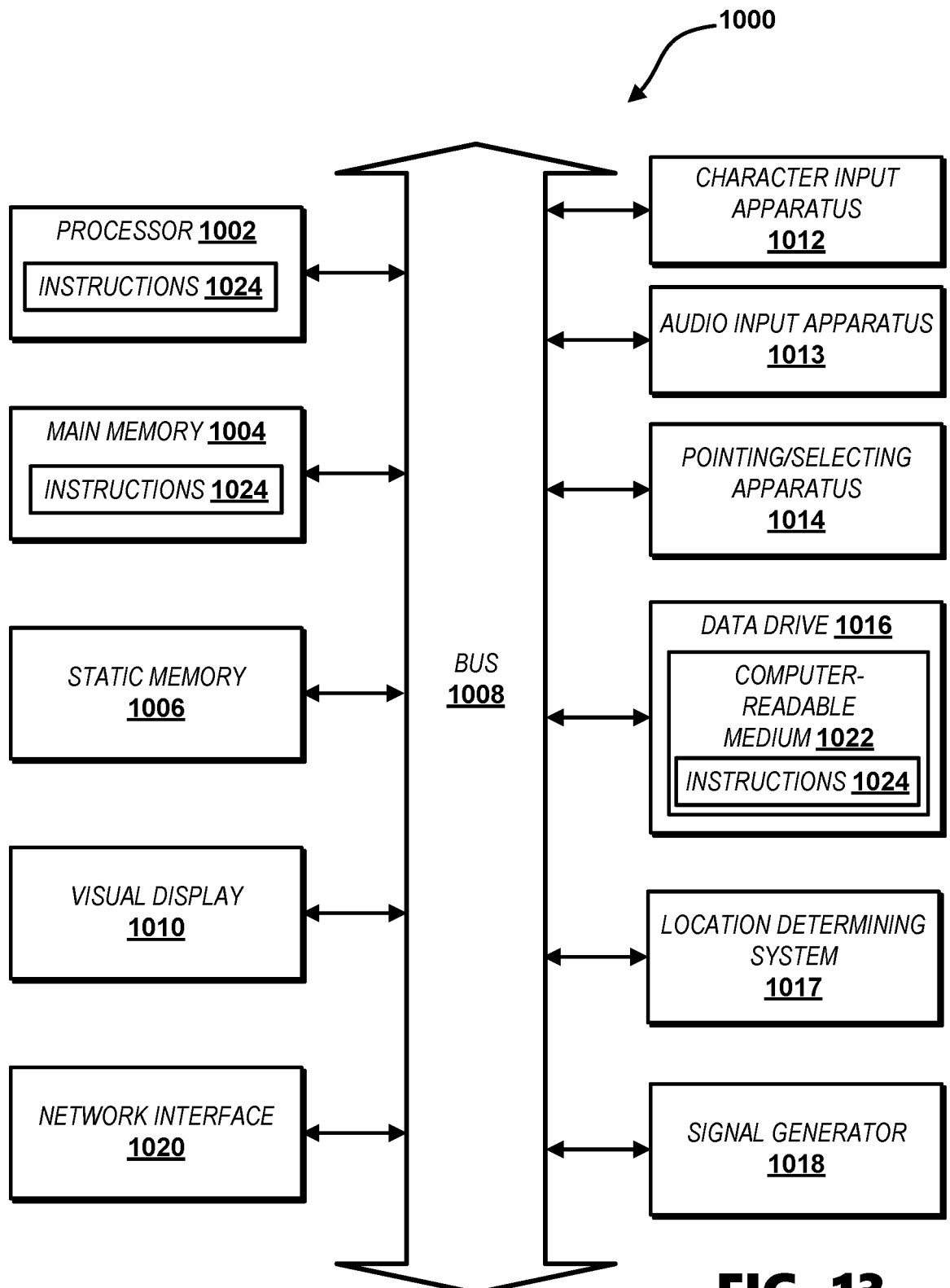

FIG. 13 is an illustrative computer system for performing described computing device control methods according to the illustrative embodiments.

DETAILED DESCRIPTION OF ILLUSTRATIVE EMBODIMENT(S)

Embodiments of the invention are described below with reference to the drawing figures wherein like numerals represent like elements throughout. The terms "a" and "an" as used herein do not denote a limitation of quantity, but rather denote the presence of at least one of the referenced items. Any directional signal such as top, bottom, left, right, upper and lower are taken with reference to the orientation in the various figures.

Figure 1:
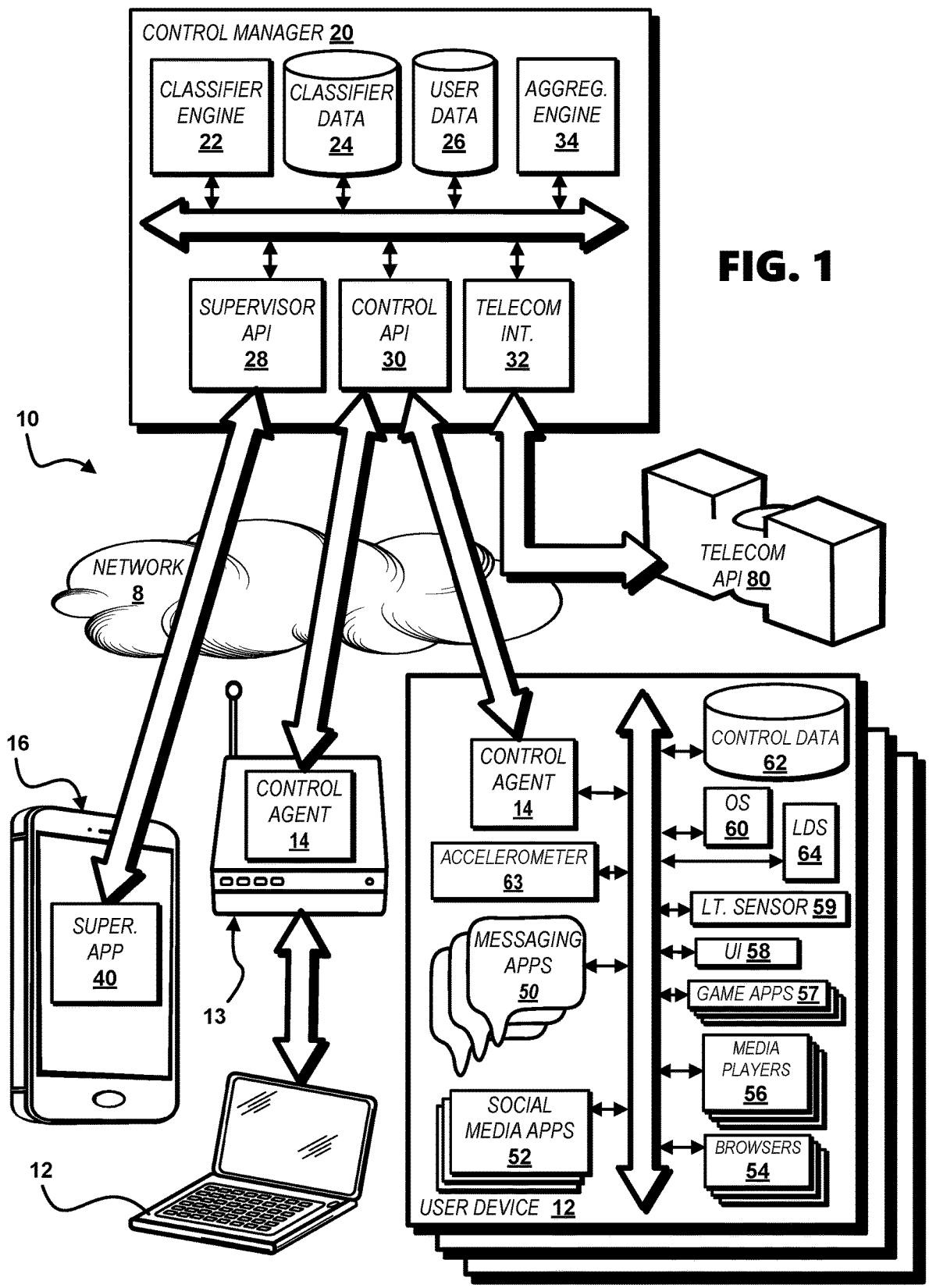
FIG. 1 shows a system enabling controlling of computing devices according to the illustrative embodiments.
Figures 2A, 2B, 2C:
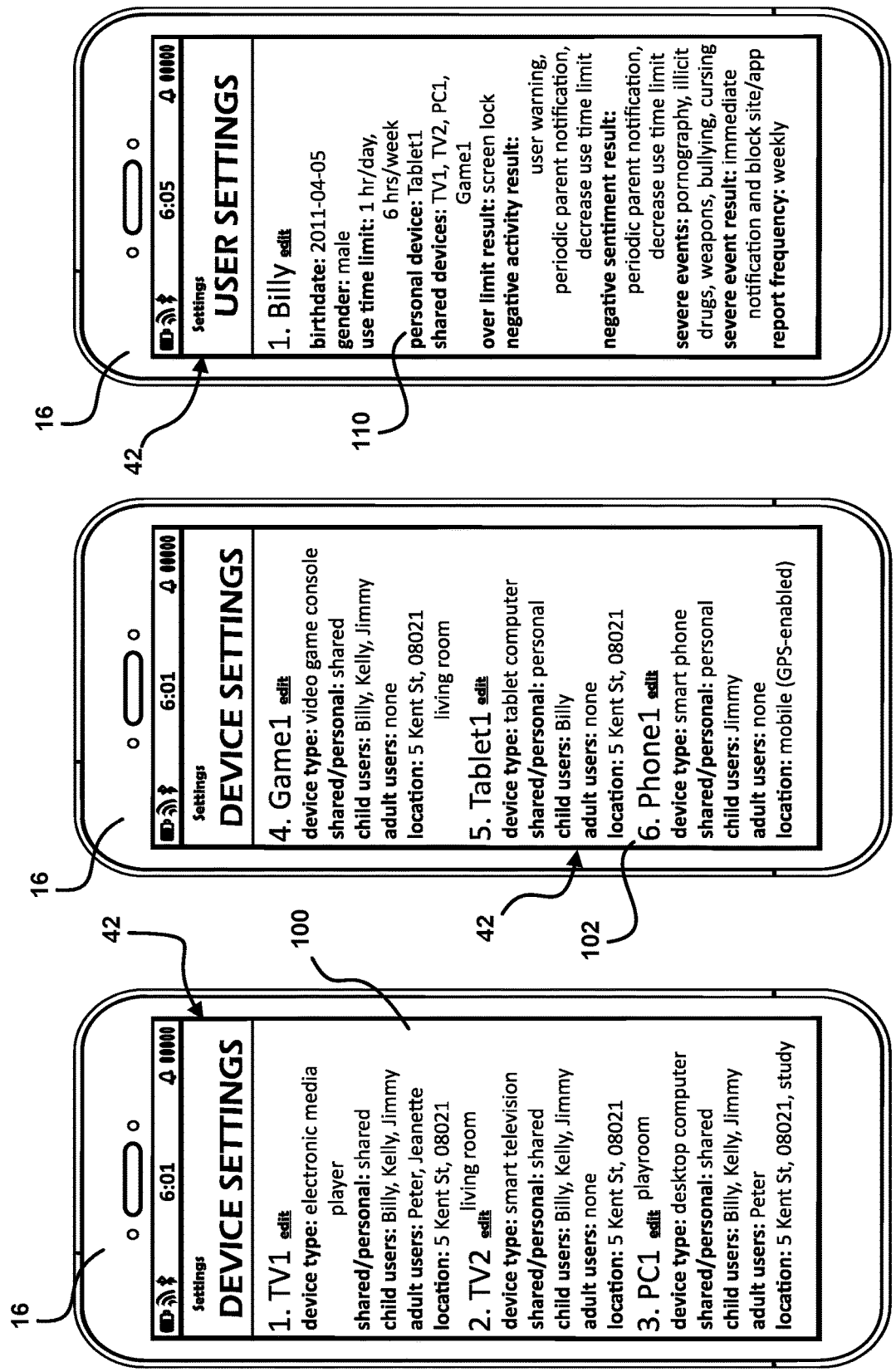
FIGS. 2A-2F show example interactive displays for entering and editing control settings for controlling computing devices.
Figures 2D, 2E, 2F:
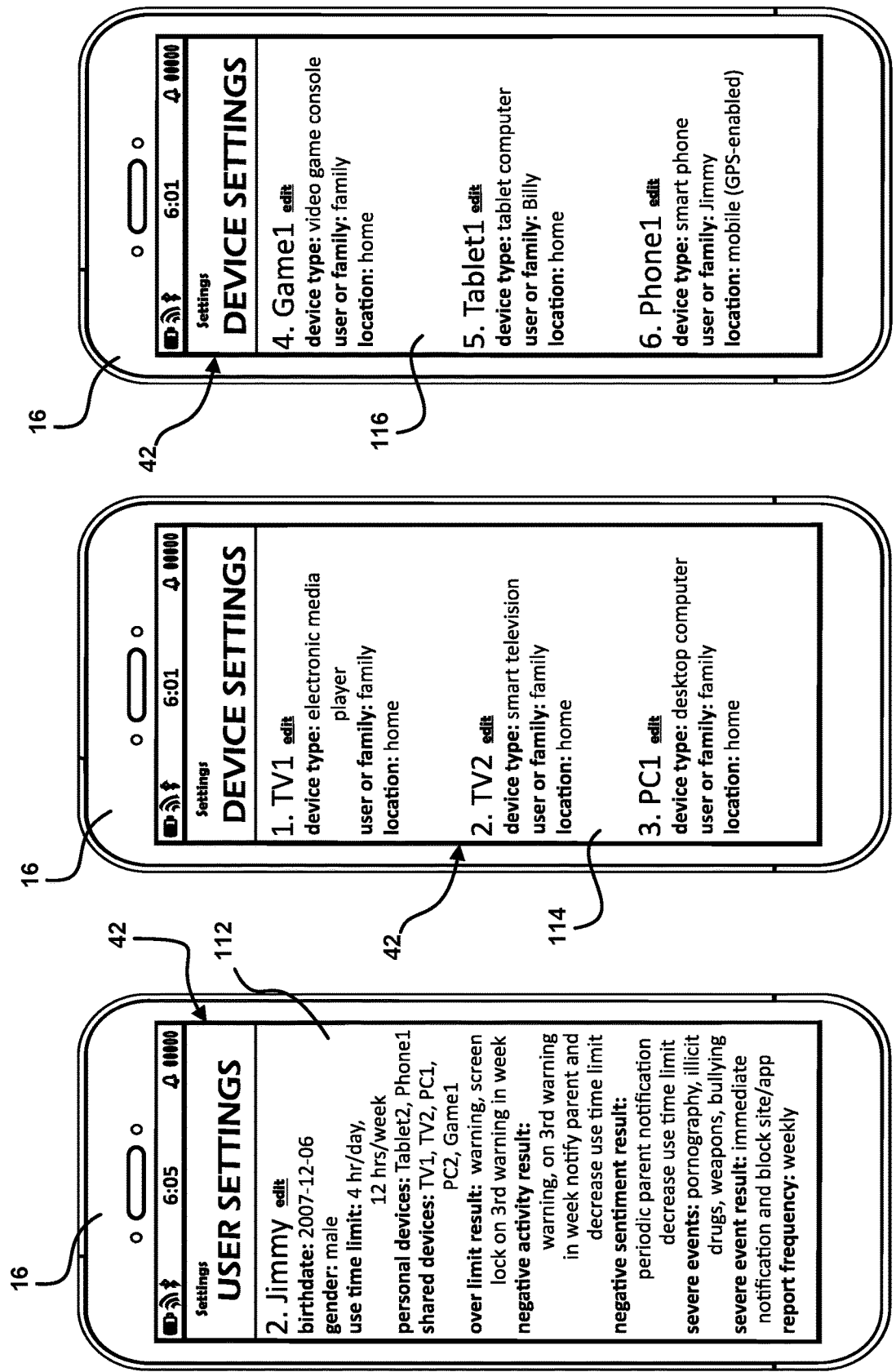

Referring to FIG. 1, a system 10 for enabling control of a computing device 12 (hereinafter "user device 12") is provided in a communications network 8 including one or more wired or wireless networks or a combination thereof, for example including a local area network (LAN), a wide area network (WAN), the Internet, mobile telephone networks, and wireless data networks such as WiFi™ and 3G/4G/5G cellular networks. The system 10 permits a supervisory user operating another computing device 16 (hereinafter "supervisor device 16") to set controls for a plurality of user devices 12 operated by a supervised user, for example a child of a parent supervisory user. Particularly, the system 10 enables identification of a supervised user's activities (e.g. study activities or social activities) and a supervised user's sentiment (e.g., friendly or offensive) based on the supervised user's use of one or more user devices 12. A supervisory user is enabled to make informed decisions on whether to intervene in a supervised user's electronic activity. The system 10 further enables an adaptive electronic screen time policy for example to block device applications or functional components or to adjust screen time based on usage trends. For example screen time can be minimized or applications blocked based on negative trends (e.g., online bullying) and screen time can be maximized or applications enabled based on positive trends (e.g., online group study). Activity and sentiment analysis is enabled via a network-connectable processor-enabled control manager 20 and a control agent 14 on electronic chats, messages, and conversations across a plurality of digital platforms, the platforms represented herein as the user devices 12. The system 10 via the control manager 20 and control agent 14 on the user devices 12 provides alerts and self-correction guides to supervised users and alerts and activity summaries to supervisory users.

The user devices 12 and supervisor device 16 operate in the network 8, which devices can be mobile and as such can be located in different geographic areas. The user devices 12 and supervisor device 16 can each include for example a smart phone or other cellular-enabled mobile device configured to operate in a wireless telecommunications network. Alternatively, the user devices 12 and supervisor device 16 can each include a personal computer, tablet device, video game console, television controller, set-top box, digital media player or other computing device. User devices 12 can be assigned to a particular user, as is typical for example with a mobile phone, or shared among more than one user, as is typical with video game consoles, television controllers, and set-top boxes. Data indicating whether a particular user device 12 is shared or assigned to a particular user can be received from a supervisory user via the supervisor application 40 and stored in the user datastore 26.

A user operates a user device 12 with a control agent 14 active. Software and/or hardware residing on the user device 12 enables the control agent 14 to monitor and restrict use of the user device 12 and content accessible by the user device 12. Software and/or hardware residing on the user device 12 further enables messaging applications 50, for example Short Message Service ("SMS") messaging applications or applications supporting other messaging protocols, for example via 3G/4G/5G cellular protocols, WiFi™ protocol or TCP/IP through the Internet. A user can implement the messaging applications 50 for example to connect to a message forwarding center, for example via GSM wireless protocol or TCP/IP through the Internet, to communicate with other user devices 12. Social media applications 52, Internet browsers 54, electronic media players 56, gaming applications 57, a user interface 58, and an operating system 60 are also enabled by software and/or hardware residing on the user device 12.

The control agent 14 can be configured as a standalone application executable by a processor of the user device 12 in communication with the messaging applications 50, social media applications 52, browsers 54, and electronic media players 56, gaming applications 57 or other communication facilitating or content providing applications. Alternatively, the control agent 14 can be provided as a processor-implemented add-on application integral with the messaging applications 50, social media applications 52, browsers 54, or other communication facilitating or content providing applications. The control agent 14 is enabled to block applications, electronic communications, and electronic media available to a user of the user device 12 through the messaging applications 50, social media applications 52, browsers 54, electronic media players or other communication facilitating or content providing applications. The control agent 14 is further enable to restrict functionality of and disable the user interface 58 via the operating system 60.

The control agent 14 can alternatively be executed on a processor-enabled router 13 such as a wireless router or other networking device that forwards data packets between computer networks. The router 13 is beneficially accessible via wired or wireless communication to the user devices 12 on which a control agent 14 is installed and active or other user devices 12 on which a control agent 14 is not installed or active. Software and/or hardware residing on the router 13 enables the control agent 14 to monitor and restrict communications from and to user devices 12 via the router 13. The control agent 14 installed on the router 13 is particularly suited for monitoring and control of relatively stationary user devices 12 such as video game consoles, televisions, set-top boxes, and desktop computers.

The network-connectable processor-enabled control manager 20 is used for controlling use of the user devices 12 via the control agent 14 and communicating with a supervisory user via a supervisor application 40. The operation of the control manager 20 is described herein with respect to the user devices 12, router 13, and the supervisor device 16. One skilled in the art will recognize that the control manager 20 can operate with other suitable wired or wireless network-connectable computing systems. The control manager 20 includes a classifier engine 22, a classifier datastore 24, a user datastore 26, a supervisor application program interface ("API") 28, a control application program interface ("API") 30, a telecommunication carrier ("telecom") interface 32, and an aggregation engine 34.

The control manager 20 can be implemented on one or more network-connectable processor-enabled computing systems, for example in a peer-to-peer configuration, and need not be implemented on a single system at a single location. The control manager 20 is configured for communication via the communications network 8 with other network-connectable computing systems including the user device 12, supervisor device 16, router 13, and a telecommunication carrier system implementing an API ("Telecom API") 80 enabling communications of the user device 12. Alternatively, the control manager 20 or one or more components thereof can be executed on the user device 12, the router 13, or other system. A supervisor application 40 is provided on the supervisor device 16. The supervisor application 40 can include a downloadable software application specially configured for interface with the supervisor API 28 to receive notices from and communicate control settings to the control manager 20 via the supervisor API 28, the control settings dictating controls implemented by the control manager 20 and the control agent 14. Alternatively, the supervisor application 40 can include a generic web browser or other application allowing a user of the supervisor device 16 to receive notices from and communicate control settings to the control manager 20 via the supervisor API 28.

The control agent 14 monitors electronic communication activity, application use, and sensor output of user devices 12 operated by a supervised user. The control manager 20 via the classifier engine 22 categorizes activity of the supervised user into themes and predicts a sentiment of the user based on the monitored signals. A supervisory user (e.g. parent) is informed of trends of activities of the supervised user (e.g. child) and sentiments of the supervised user via the supervisor application 40. The control agent 14 executes an adaptive screen time policy based on the determined activities and sentiments of the supervised user.

Referring to FIGS. 2A, 2B, 2C, 2D, 2E, and 2F a user interface 42 enabled by the supervisor application 40 on the supervisor device 16 provides interactive displays such as example interactive displays 100, 102, 110, 112, 114, 116 for entering and editing control settings by a supervisory user such as a parent. A first example interactive display 100 and second example interactive display 102 permit such user to identify and name user devices 12, identify whether the user devices 12 are shared or assigned to a particular user, name the child and adult users of the user devices 12, and set locations of the user devices 12. The first example interactive display 100 identifies an "electronic media player", a "smart television", and a "desktop computer" as "TV1", "TV2", and "PC1" respectively, "Billy", "Kelly", and "Jimmy" as "child users", "Peter" and "Jeanette" as "adult users", and "living room", "playroom", and "study" at "5 Kent St, 08021" as the locations of the listed devices. A second example interactive display 102 identifies a "video game console", "tablet computer", and "smart phone" as "Game1", "Tablet1", and "Phone1" respectively. The names "Billy", "Kelly", and "Jimmy" are identified as "child users" of Game 1, "Billy" is identified as the exclusive assigned user of "Tablet1", and "Jimmy" is identified as the exclusive assigned user of "Phone1". The address "5 Kent St, 08021" and "living room" are identified as the location of "Game1", and "5 Kent St, 08021" is identified as the location of "Tablet1". The "Phone1" is indicated as "mobile (GPS-enabled)" denoting a wireless device.

Third and fourth example interactive displays 110, 112 identify supervised user birthdate, supervised user gender, use time limit for the supervised user across one or more personal or shared devices, exclusive personal devices and shared devices of the supervised user, and the result that occurs when the supervised user's use time goes over the use time limit. The third and fourth example interactive displays 110, 112 also identify the result of a determination of negative activity and negative sentiment based on monitoring of a supervised user's device use. The third and fourth example interactive displays 110, 112 further identify events classified as severe, the result of a determination of a severe event based on monitoring of a supervised user's device use, and a frequency of reports transmitted to a supervisory user regarding monitored use of user devices 12 by a particular supervised user.

The third example interactive display 110, including settings entered by the supervisory user (e.g. a parent), indicates a male supervised user named "Billy" subject to user device use time limits of one hour per day and six hours per week. Billy is associated with one exclusive personal device "Tablet1" and four shared devices "TV1, TV2, PC1, [and] Game1". Billy is subject to a device screen lock for his device use, as aggregated across all user devices 12, exceeding a use time limit. The third example interactive display 110 also indicates that determined negative activity results in a user warning to the supervised user Billy, periodic notifications to the supervisory user, and a decrease in a use time limit for the supervised user Billy. Determined negative sentiment results in periodic notification (e.g. in a report) to the supervisory user (e.g. parent) and a decrease in the daily or weekly use time limit. The third example interactive display 110 further indicates that "pornography, illicit drugs, weapons, bullying, [and] cursing" are classified as severe events and that a determination of a severe event results in "immediate notification" to the supervisory user and blocking of a website or application through which the determined severe event is enabled. A report frequency is identified as weekly by the third example interactive display 110.

The fourth example interactive display 112, including settings entered by the supervisory user (e.g. a parent), indicates a male supervised user named "Jimmy" subject to user device use time limits of four hours per day and twelve hours per week. Jimmy is associated with two exclusive personal devices "Tablet2" and "Phone1" and five shared devices "TV1, TV2, PC1, PC2, [and] Game1". Jimmy is subject to a warning and a device screen lock after a third warning in a week for his device use, as aggregated across all user devices 12, exceeding a use time limit. The fourth example interactive display 112 also indicates that determined negative activity results in a user warning to the supervised user Jimmy, a notification to the supervisory user (e.g. parent) after a third warning in a week, and a decrease in use time limit for the supervised user Jimmy. Determined negative sentiment results in periodic notification (e.g. in a report) to the supervisory user (e.g. parent) and a decrease in the daily or weekly use time limit. The fourth example interactive display 112 further indicates that "pornography, illicit drugs, weapons, [and] bullying" are classified as severe events and that determination of a severe event results in "immediate notification" to the supervisory user and blocking of a website or application through which the determined severe event is enabled. A report frequency is identified as weekly by the fourth example interactive display 112.

Control settings from the supervisor device 16 are communicated via the control API 30 of the control manager 20 to the control agent 14 on the router 13 or on the user device 12 operated by the supervised user, for example a child of a parent supervisory user operating the supervisor device 16. Control settings can be stored locally on the user device 12 in a control datastore 62 for access by the control agent 14 or on a suitable datastore on the router 13.

A fifth example interactive display 114 and sixth example interactive display 116 may be provided instead of the first and second example interactive displays 100, 102 and requiring less detailed user inputs. The fifth and sixth example interactive displays 114, 116 permit a user to identify whether the user devices 12 are shared or assigned to a particular user by entering "family" to indicate a shared user device 12 potentially used by all members of a family or a particular user's name, for example "Billy", to indicate a user to whom the device is specifically assigned. The fifth and sixth example interactive displays 114, 116 further permit a user to indicate a user device 12 is used at a "home", rather than indicating a specific address, or "mobile" for Global Positioning System (GPS) enabled wireless devices.

The control agent 14 performs signal collection by one or more monitoring processes on the user devices 12. The control agent 14 converts voice communication and video into text via machine learning enabled speech recognition and extracts script and images from websites via browsers 54 and social media applications 52. Text summarization is performed via machine learning processes, for example implementing a recurrent neural network ("RNN") model. The control agent 14 further performs captures of a display screen of the user interface 58 and captures of video windows within the display screen. The display captures can be infrequent and performed at a low picture resolution to minimize computation and conserve system resources.

The signal collection can be performed across a plurality of platforms (i.e., user devices 12) for each supervised user. The control agent 14 is installed on each user device 12 operated by a particular supervised user and registered with the control manager 20 using a unique identifier assigned to the particular supervised user. Processing of collected signals can be performed both locally on the user device 12 via the control agent 14 and collectively at a backend server implementing the control manager 20. An activity summary can be provided to the supervisory user via the supervisor application 40 broken down per user device 12 and provided with cumulative data for all user devices 12 operated by the particular supervised user. For example a report can relate 1 hour of gaming activity on a personal computer and 30 minutes of gaming activity on a mobile device.

The control agent 14 determines a supervised user's activities based on monitored signals from the user device 12, beneficially implementing a substantially continuous (e.g. always on) low bandwidth keyword/key phrase monitoring process on substantially all communications/activities. Upon detection of a significant trigger event, or during times scheduled for periodic batch processing, a full activity analysis with a higher computational requirement is performed by the control agent 14 or the control manager 20. The keyword/key phrase monitoring process prompts activity understanding based on a frequent set of keywords and key phrases. The control agent 14 initially uses a default dictionary for keyword and key phrase monitoring which is over time personalized based on words frequently used by the supervised user. A personalized keyword/key phrase dictionary is built and updated based on frequent words from the full activity analysis which keywords and key phrases are associated with particular activity categories. For example, the phrase "x squared" can be added to the personalized keyword/key phrase dictionary to indicate the activity of math study. The control agent 14 can further implement low bandwidth image classification to detect key images, for example guns, pornography, and school textbooks. Particular keywords, key phrases, and key images (e.g., profanity or pornographic images) trigger full activity analysis and can result in restriction of the user device 12 and notification to a supervised user, for example blocking calls or messages or showing warning alerts to moderate communication. Positive keywords or key phrases, for example indicating school work or friendly discussions, will not generally trigger a full activity analysis.

The full activity analysis which is triggered by keyword analysis, or alternatively is run continuously, beneficially implements natural language processing on text extracted from audio and video calls, electronic messages, website text and audio and video accessed online via communication. Content is categorized by the control manager 20 or the control agent 14 in real time for immediate monitoring or periodically (e.g. daily at night based on saved text scripts) to generate periodic summaries (e.g. "Today there were 2 hours of math study and 1 hour of social chat about sports . . . "). Activities can be categorized based on keyword analysis and full activity analysis into main categories and subcategories. For example a main category of "study" can correspond to a subcategories of "online lecture", "group discussion", or "online research". A main category of "play" can correspond to subcategories of "social chat", "game playing", or "movie watching". The control manger 20 or the control agent 14 based on the collected data further categorizes activities, particularly electronic communications, based on sentiment into positive and negative main categories. A positive category can for example include "friendly" and "supportive" subcategories. A negative category can for example include "violent", "sexual", "aggressive", and "insulting" subcategories.

The control manager 20 via the aggregation engine 34 enables temporal trend tracking and prediction. Temporal trends of supervised users' activities are tracked, and changes in particular activities relative to other activities (i.e., "activity ratios") over time are determined. For example it is determined if a supervised user's study time is increasing or showing any sudden decrease or whether a supervised user has been chatting socially via messaging applications 50 with bad-influence friends as identified for example by call and chat correspondences.

The control manager 20 and the control agent 14 can further predict future activity ratios based on temporal trends via a machine learning estimator based on prior history. The machine learning estimator can include for example a predictor, progressor, or model (e.g. an RNN predictor, progressor, or model). For example video game playing time can be projected to increase further or return to average. If a particular activity is projected to be performed for a time period exceeding a guide-lined boundary or not predicted to return to average, an alert can be issued to a supervisory user, for example "Noah has been playing video games more than before and his playing behavior is not likely to return to normal. Your attention would be appropriate!"

The control manager 20 and the control agent 14 can further track a temporal trend of sentiment. Emotion escalation can be detected (e.g. aggressiveness or sadness), and a risk level can be predicted based on a temporal trend, for example by implementing an RNN based on prior history. If a risk level is projected to rise above a particular guide-lined boundary, the control manager 20 can transmit an alert to the supervisory user for example, "Noah has been more aggressive lately with more offensive chats and videos. More family time and conversation would be helpful to Noah".

Monitored sensor data for example from a location determining system ("LDS") 64 such as a global positioning system ("GPS"), an accelerometer 63, the user interface 58, and a light sensor 59 of the user device 12 can indicate physical activity and accordingly is also used in determining activities of the supervised user. Sensor data can supplement communication data such as electronic communications to more accurately determine user activity. For example, frequent hand motions and screen touches sensed by the user interface 58 can indicate game playing or chatting depending on motion type. Slow geographic location change determined by the LDS 64 and acceleration sensed by the accelerometer 63 of a particular signature or frequency can indicate physical activity. Screen brightness output by the user interface 58 or ambient light levels detected by the light sensor 59 can be used to determine whether a supervised user is indoors or outdoors, or whether the supervised user is physically active or not physically active.

The control manager 20 via the supervisor API 28 and the supervisor application 40 on the supervisor device 16 inform the supervisory user of activity and sentiment trends. Accordingly, a supervisory user (e.g. a parent) is enabled to make informed decisions on whether to intervene in a supervised user's (e.g. a child's) digital activities. The control manager 20 via the supervisor application 40 can provide a supervisory user immediate notification upon severe events or events matching to predefined criteria which can be set by the supervisory user via the supervisor application 40 (e.g. social chat about pornography). The supervisor application 40 can further provide to the supervisory user a periodic summary of a supervised user's determined activity, for example math online lecture 1 hour, computer science project 1.5 hours, social study group discussion 1.5 hours, social chat 2 hours". A color-coded sentiment summary is beneficially also provided, for example indicating a supervised user is "friendly 50% of time, aggressive 20% of time (severity 3 out of 5) and neutral 30% of time". The sentiment summary can also provide color-coded behavior risk levels for example indicating suicide risk, violence risk, and lack of social engagement risk, with the color green indicating low risk, yellow indicating medium risk, and red indicating high risk. The supervisor application 40 can further relate activity and sentiment trends of the supervised user over time, for example "Noah has been happier in last 2 weeks!"

The control agent 14 executes an adaptive screen time policy based on use data determined by the control agent 14 or determined by the control manager 20. The adaptive screen time policy is executed to decrease or block negative activities while increase or encourage positive activities on a user device 12. The control agent 14 can for example block or minimize screen time in response to a negative trend (e.g. bullying) and increase screen time in response to a positive trend (e.g. group study). In such manner, self-corrective action is encouraged based on fast penalization of, rewarding of and notification to a supervised user. To encourage a supervised user to take corrective action on their own, the assisted correction process can be implemented by the control agent 14 to provide warnings for a predefined period of time or provide a predefined number of warnings before informing supervisory user of the supervised user's objectionable activity (e.g. "three strikes" before notifying parent). This helps to maintain a supervised user's privacy, allowing occasional mistakes by the supervised user and enabling self-correction. Speed of action is dependent on trend or event severity. Immediate adjustment to screen time or blocking of the user device 12 use is implemented by the control agent 14 responsive to a determination of a severe event (e.g. viewing of pornography online) along with a warning notification to the supervised user. For example, a notification can be provided on the user device 12 "Noah, you should have known better. This site is to be blocked from now on." A less severe adjustment to screen time or a warning only can be triggered based on minor events (e.g. playing of video games for longer than a threshold time). An example of a warning issued by the control agent is "Noah, you've been playing video games too often. Can we try to do more exercise instead? Let's set a goal of a maximum of 1 hour game time per day, okay?"

Referring to FIGS. 3A, 3B, and 3C the supervisor application 40 via the user interface 42 enables interactive displays such as example seventh, eight, and ninth interactive displays 120, 122, and 126 for relating a report to a supervisory user via the supervisor application 40 regarding electronic communication activity and other device use of a supervised user. Reports enable a supervisory user to make informed decisions regarding whether to intervene in a supervised user's digital activity. A supervisory user is beneficially enabled to scroll seamlessly between the interactive displays 120, 122, and 126. The report is generated based on an analysis performed by the classifier engine 22 and the aggregation engine 34 of the control manager 20.

The seventh interactive display 120 describes the supervised user Jimmy's use time in hours and minutes during a reporting period on all user devices 12 used by Jimmy including "Tablet2" and "Phone1" and further provides a breakdown of activities during the reporting period based on analysis performed by the classifier engine 22, which activities include "math study", "online math lecture", "social studies group discussion", "social chatting", "video games", and non-classifiable activities "uncategorized". A "Sentiment Summary" is further provided based on analysis by the classifier engine 22 indicating the user Jimmy is "Often friendly and supportive, but occasionally aggressive and insulting." "Sentiment Ratings" are provided based on the analysis indicating the user Jimmy is "Friendly" fifty percent of the time, "Aggressive" at a medium severity level twenty percent of the time, and "Neutral" thirty percent of the time he is active on user devices 12. In the eighth interactive display 122, sentiment risk factors generated by the activity analysis show by bars 124 a low suicide risk, medium violence risk, and high social non-engagement risk, which, bars 124 are beneficially color coded green for low risk, yellow for medium risk, and red for high risk. Results of an "Activity Analysis" indicate that "More social chats recently with bad influence friends. Playing more video games than before, and this behavior likely to continue. You may want to talk to JIMMY about this." The ninth interactive display 126 shows results of a "Sentiment Analysis" in which it is indicated that "JIMMY has been more aggressive lately with more offensive chats and offensive viewed videos. More family time and conversation may be helpful to JIMMY." Confirmation that a supervisory user has viewed the report can be made by actuating an "OK" button 128 on the interactive display 126.

Referring to FIGS. 4A and 4B the supervisor application 40 via the user interface 42 further enables interactive displays such as example tenth and eleventh interactive displays 140, 150 for relating alerts to a supervisory user via the supervisor application 40 regarding electronic communication activity of a supervised user. The alerts are generated based on an analysis performed by the classifier engine 22 of the control manager 20 and delivered immediately or shortly after particular detected activities.

The tenth interactive display 140 relates an event performed by the supervised user Jimmy detected based on analysis performed by the classifier engine 22, which event is related as "JIMMY has been chatting about pornography on ZETA chat application." The tenth interactive display 140 further informs the supervisory user that "ZETA chat application has been blocked on JIMMY's devices." Confirmation that a supervisory user has viewed the report can be made by actuating an "OK" button 142 on the interactive display 140. Further, an "Unblock App" button 144 is generated by the supervisor application 40 to permit a supervisory user to restore the blocked application on the supervised user's user device 12 to working status by actuation of the button 144.

The eleventh interactive display 150 relates another event performed by the supervised user Jimmy detected based on analysis performed by the classifier engine 22, which event is related as "JIMMY has been generating posts referencing weapons on GAMMA social networking site." The eleventh interactive display 150 further informs the supervisory user that "GAMMA social networking site has been blocked on JIMMY's devices." Confirmation that a supervisory user has viewed the report can be made by actuating an "OK" button 152 on the eleventh interactive display 150. Further, an "Unblock Site" button 154 is generated by the supervisor application 40 to permit a supervisory user to restore the blocked application on the supervised user's user device 12 to working status by actuation of the button 154.

Referring to FIGS. 5A, 5B, 5C, and 5D, the control agent 14 on a user device 12 enables notifications initiated by determinations of the control manager 20 in the form of example twelfth, thirteenth, fourteenth, and fifteenth interactive displays 160, 170, 180, 190. The twelfth example interactive display 160 includes a warning generated by the control agent 14 via a user interface 58 on supervised user Jimmy's user device 12 in response to a determination by the classifier engine 22 that supervised user Jimmy has communicated regarding pornography using the ZETA chat application. The twelfth example interactive display 160 indicates "JIMMY, you should know better than to chat about pornography", and that as a result "ZETA chat application has been blocked," which blocking is performed by the control agent 14 on all user devices 12 assigned to Jimmy.

The thirteenth example interactive display 170 includes a warning generated by the control agent 14 via the user interface 58 on supervised user Jimmy's user device 12 in response to a determination by the classifier engine 22 that supervised user Jimmy has communicated a post regarding weapons using the GAMMA social networking site. The thirteenth example interactive display 170 indicates "JIMMY, you should know better than to post about weapons", and that as a result "GAMMA social networking site has been blocked," which blocking is performed by the control agent 14.

The fourteenth example interactive display 180 is generated by the control agent 14 via the user interface 58 on the supervised user Jimmy's user device 12 in response to a determination by the classifier engine 22 that Jimmy has exceeded a particular threshold amount of time using applications classified as games. The fourteenth example interactive display 180 indicates "JIMMY, you have been playing too many video games." The fourteenth example interactive display 180 further includes the requests "Can we try to do more exercise instead?" and "Let's set a goal of 1 hour game time per day maximum, OK?"

The fifteenth example interactive display 190 is generated by the control agent 14 via the user interface 58 on supervised user Jimmy's user device 12 in response to a determination by the classifier engine 22 and the aggregation engine 34 that supervised user Jimmy has performed bullying activity and has been warned about the bullying activity at least once prior. The display 180 indicates "JIMMY, this is your second warning about bullying online." The display 180 further indicates: "Your use time limit has been decreased to 3 hours per day", and "ZETA chat application will be blocked and your parent notified if bullying continues."

Confirmation that the supervised user Jimmy has viewed the alerts can be made by actuating "OK" buttons 162, 172, 182, 192 on the example interactive displays 160, 170, 180, 190 respectively. The control agent 14 via the control manager 20 or via a messaging application 50 is further enabled to initiate a communication to Jimmy's mother's supervisor device 16 via the supervisor application 40 or a messaging application on the supervisor device 16, for example relating messages as described above with reference to the tenth and eleventh interactive displays 140, 150.

Referring to FIG. 10, a flowchart shows a method 500 of controlling use of network-connectable devices. The method 500 and associated processes are described with reference to the components of the system 10 shown in FIG. 1, including the user device 12, the supervisor device 16, the processor-enabled control manager 20, the control agent 14, and the supervisor application 40. Alternatively, the method 500 can be performed via other suitable systems.

In a step 502, the control agent 14 monitors by a first computational process communication on a particular user device 12 operated by a supervised user. A trigger event is determined by the control agent 14 based on the monitoring by the first computational process (step 504). Responsive to determining the trigger event, the control agent 14 monitors the communication on the user device 12 by a second computational process (step 506). The second computational process operates at a higher processor utilization level than the first computational process. Since monitoring by the first computational process requires a relatively lower processor utilization level, the monitoring by the first computational process can include monitoring by a substantially continuous and substantially real time process. Since monitoring by the second computational process requires a relatively higher processor utilization level, the monitoring by the second computational process can include one or both of monitoring periodically for a particular time period or monitoring periodically particular batches of data. Use of the user device 12 is restricted by the control agent 14 at least based on the monitoring by the second computational process (step 508). The use of the user device 12 can further be restricted based on the monitoring of the communication by the first computational process. Further, control agents 14 on other user devices 12 operated by the supervised user can monitor communication on the other user devices 12 using one or both of the first computational process or the second computational process, and restrict one or more of the user devices 12 operated by the supervised user based on the monitoring of all user devices 12 operated by the supervised user. Communication can include for example audio, video, or text chat communications via messaging applications 50, audio, video, or text posts via social media applications 52, audio, video, or text inputs, downloads, content viewing, or game play via internet browsers 54, content viewing on the electronic media players 56, and single or multiplayer game play via gaming applications 57.

In the method 500, the control agent 14 beneficially converts audio data or visual data of the communication into text and compares the text with a keyword list or a key phrase list by the first computational process. In such case the determining of the trigger event includes detecting one or both of a particular keyword or a particular key phrase in the text. Keyword and key phrase detection requires a relatively low level of processor utilization. The control agent 14, responsive to the trigger event conducts natural language processing on the text by the second computational process to categorize the text, and the user device 12 is restricted based at least on the categorizing of the text. Text can additionally or alternatively be categorized by the control agent 14 by the first computational process. The control agent 14 can capture display screen output of the user interface 58, identify text in the display screen output, and categorize the text, by one or both of the first computational process or the second computational process, as representing a particular activity of the supervised user. Alternatively, the control agent 14 can, via a browser 54, extract script or an image from a network-accessible computing system implementing a social networking application or other data sharing platform, and the control agent 14 can identify text in the script or the image for categorization as described above.

Text is beneficially extracted and categorized by one or both of the monitoring of the first computational process or the second computational process. The classifier engine 22 or the control agent 14 can generate personal keywords or personal key phrases based on the categorizing, for example by implementing an estimator in the form of a recurrent neural network ("RNN") described herein with reference to FIG. 7A, which personal keywords or personal key phrases are stored in the user datastore 26. A trigger event can thereafter be determined by identifying the personal keywords or personal key phrases in a communication, for example by keyword or key phrase matching performed by the first computational process.

Captured screen output can also be used by the control agent 14 to identify images. The monitoring by the first computational process can include capturing first display output at a first resolution and performing image determining analysis on the first display output to determine the trigger event, and the monitoring by the second computational process can include capturing second display output at a second resolution higher than the first resolution and performing image determining analysis on the second display output to determine a particular image, and use of the particular user device can be restricted based on the determined particular image. Alternatively, the monitoring by the first computational process can include capturing first video output at a first frequency and performing image determining analysis on the first video output to determine the trigger event, and the monitoring by the second computational process can include capturing second video output at a second frequency higher than the first frequency and performing image determining analysis on the second video output to determine a particular image, wherein use of the particular user device is restricted based on the determined particular image.

Beneficially, the control agent 14 determines a change over time of a categorized activity of the particular user by the second computational process and restricts use of the user device 12 based on the determined change over time of the categorized activity. The control agent 14 can notify a supervisory user of the change over time of the categorized activity by electronic message via a messaging application 50 or the supervisor API 28 for example in the manner shown in FIG. 3B with reference to interactive display 122. The control agent 14 can alternatively un-restrict use of a previously restricted user device 12 based on a determined change over time of the categorized activity by the second computational process. A plurality of activities can be categorized, and a change over time of a particular activity relative to a total of others of the plurality of activities of the particular user can be determined by the second computational process, wherein the use of the particular user device 12 is restricted based on the determined change over time of the particular activity of the plurality of activities relative to the total of the plurality of activities.

Restricting use of the user device 12 can include disabling use of an application or functional component of the user device 12. Unrestricting use of the user device 12 can include re-enabling use of a previously disabled application or functional component. Functional components of a user device 12 can include software or hardware driven features, settings, capabilities and resources. Different user devices 12 may correspond to different functional components. Restricting use of the user device 12 can alternatively include providing instructions to a telecommunication carrier system via a Telecom API 80 to restrict network communication protocols accessible to the user device 12.

Natural language processing is beneficially performed by the classifier engine 22 which implements one or more classifiers and estimators trained over time based on data in the user datastore 26, which data resulting from such training is stored in the classifier datastore 24 for use in the natural language processing. The one or more classifiers and estimators can include for example linear regression, Naïve Bayes, logistic regression, decision tree, boosted tree, support vector machine, artificial neural network (e.g. RNN), nearest neighbor, K-means, dimensionality reduction algorithm, or gradient boosting algorithm or combinations thereof.

A supervisory user is enabled to provide criteria via the supervisor application program interface ("API") 28 using the supervisor application 40. The control agent 14 receives the criteria from the control API 30 and monitors the communication by one or both of the first computational process or the second computational process based on one or more of the criteria from the party. The control agent 14 restricts use of the user device 12 further based on the one or more criteria and notifies the particular user based on the monitoring.

The change over time of the categorized activity determined by the second computational process can include a change in quantity or duration of the categorized activity. Further, the second computational process can render a prediction of a future state of a particular categorized activity and restrict the use of the user device 12 based on the predicted future state of the categorized activity. The classifier engine 22 beneficially applies a recurrent neural network ("RNN") estimator to the determined change over time to predict the future state of the categorized activity. An example of such an estimator in the form of a fourth recurrent neural network ("RNN") 320 is described herein with reference to FIG. 9B.

Natural language processing of the second computational process can be used by the control agent 14 in also determining a sentiment of the supervised user of the user device 12 by an analysis of the text converted from the audio data or the visual data of the communication. The second computational process can further include determining a change over time of the sentiment of the supervised user, and the control agent 14 can restrict use of the supervised user's user device 12 based on the determined change over time of the sentiment. The control agent 14 can notify a supervisory user of the categorizing of activities and sentiments by electronic message via a messaging application 50 or via the supervisor API 28 for example in the manner shown in FIGS. 3A, 3B, 3C, 4A, and 4B with reference to example interactive displays 120, 122, 126, 140, and 150.

The user device 12 is equipped with an accelerometer 63 for detecting acceleration of user device 12 and a location determining system ("LDS") 64 such as a global positioning system ("GPS") for determining location of the user device 12. The control agent 14 can restrict the use of the user device 12 further based on determining by the control agent 14 acceleration of the user device 12, for example acceleration of a particular magnitude for a particular duration. The control agent 14 can also restrict the use of the user device 12 based on location determined by the LDS 64. Small changes in location over time and frequent periodic large magnitude acceleration measurements can be indicative of walking, running, or other exercise. The control agent 14 or the classifier engine 22 for example can perform an analysis of text converted from audio data or visual data of the communication and categorize activities of the supervised user based on the analyzed text and based on either or both of the device location and device acceleration during the time when the communication was performed. The control agent 14 or the classifier engine 22 can determine a change over time of one or more categorized activities, and the control agent 14 can restrict use of the user device 12 based on the determined change over time of the categorized activity.

The light sensor 59 of the user device 12 is useful in detecting ambient light levels used to set a screen brightness of the user interface 58. The control agent 14 can determine a sensed light level, or alternatively a screen brightness level of the user device 12 and further restrict use of the user device 12 based on the sensed light level or the screen brightness level of the user device 12. Light levels based on data accessed by the control agent 14 directly from the light sensor 59 or inferred by the control agent 14 from screen brightness levels provide an indication of whether a supervised user is likely to be indoor or outdoor, which provides an indication of whether a supervised user is physically inactive or active. High levels of light detected by the light sensor 59 or detected high screen brightness can suggest for example that a supervised user is outside and physically active where it may be more or less desirable to limit use of the user device 12.

The user interface 58 of the user device 12 is beneficially equipped with a resistive, capacitive or surface-wave based touch screen system. The control agent 14 determines a frequency of touch screen inputs by the supervised user and restricts the use of the user device 12 further based on the determining by the particular user device 12 of the frequency of the touch screen inputs. Frequent actuation of a touch screen or rapid motioning of a hand on or near a touch screen may be indicative of game play or online or application-based chatting depending on the type of motion inputs.

Referring to FIG. 11, a flowchart shows a method 600 of controlling use of network-connectable devices. The method 600 and associated processes are described with reference to the components of the system 10 shown in FIG. 1, including the user device 12, the supervisor device 16, the processor-enabled control manager 20, the control agent 14, and the supervisor application 40. Alternatively, the method 600 can be performed via other suitable systems.

In a step 602, the control agent 14 monitors device usage including communication on a particular user device 12 operated by a supervised user. The monitoring of the usage can include monitoring one or more of a telephone call, a video call, game play, an electronic message, or a website interaction. The control agent 14 or the classifier engine 22 converts one or both of audio data or visual data of the communication into text or images (step 604) and categorizes activities of the particular user based on the text or the images (step 606). Activities can be categorized for example as academic activities or social activities. One or more of the control agent 14, the classifier engine 22, or the aggregation engine 34 determines a change over time of the categorized activities of the particular user (step 608), and use of the user device 12 is restricted based on the determined change over time of the categorized activities (step 610).

Beneficially, the control agent 14 analyzes one or both of the text or the images and categorizes the activities in real time by a first computational process operating at a first processor utilization level, and the control agent 14 or the classifier engine 22 analyzes one or both of the text or the images and categorizes the activities on a periodic basis by a second computational process operating at a second processor utilization level higher than the first processor utilization level. The control agent 14 can further capture display screen output of the user device 12. The control agent 14 or the classifier engine 22 can apply a classifier to the display screen output to determine a particular image, and categorize the activities of the particular user based on the determining of the particular image. The control agent 14, the classifier engine 22, or the aggregation engine 34 can determine a change over time of one particular categorized activity relative to a total of the categorized activities, and the control agent 14 can restrict the use of the user device 12 based on the determined change over time of the particular categorized activity relative to the total of the categorized activities.

The control agent 14 or the classifier engine 22 can further predict a future state of the categorized activities based on the determined change over time, and the control agent 14 can restrict use of the user device 12 further based on the predicted future state of the categorized activities. The control agent 14 or the classifier engine 22 can further determine a sentiment of the particular user by an analysis of the text. The control agent 14, the classifier engine 22, or the aggregation engine 34 can further determine a change over time of the sentiment of the particular user. The control agent 14 can restrict use of the user device 12 further based on the determined change over time of the sentiment. Further, the control agent 14 or the classifier engine 22 can predict a risk level of the particular user based on the change over time of the sentiment of the particular user 12, and the control agent 14 can restrict use of the user device 12 further based on the predicted risk level. Risk level can be predicted for example by application of a recurrent neural network ("RNN") estimator as described herein with respect to FIG. 8A.

The determined change over time of the categorized activities can include a first change over time of the categorized activities and a second change over time of the categorized activities after the first change over time. The control agent 14 can generate a notification on the user device 12 responsive to the first change over time of the categorized activities to warn the supervised user about objectionable device use, and restrict the use of the particular user device 12 based on the second change over time of the categorized activities, the second change over time corresponding to continued objectionable device use.

The control manager 20 further monitors other device usage on one or more other user devices 12 operated by the particular user via control agents 14 and stores use data in the user datastore 26. The control manager 20 via the control API 30 enables respective control agents 14 on such user devices 12 to restrict use of any or all user devices 12 operated by a particular user based on the monitoring of the device usage on one or more other user devices 12 operated by the particular supervised user.

Referring to FIG. 12, a flowchart shows a method 700 of controlling use of network-connectable devices. The method 700 and associated processes are described with reference to the components of the system 10 shown in FIG. 1, including the user device 12, the supervisor device 16, the processor-enabled control manager 20, the control agent 14, and the supervisor application 40. Alternatively, the method 700 can be performed via other suitable systems.

In a step 702, the control agent 14 monitors communication on a particular user device 12 operated by a supervised user. The control agent 14 converts one or both of audio data or visual data of the communication into text (step 704). The control manager 20 or the control agent 14 determines a sentiment of the supervised user at least based on the text (step 706), determines a change over time of the sentiment of the supervised user at least based on the text (step 708), and restricts use of the user device 12 of the supervised user at least based on the determined change over time of the sentiment (step 710). Further, the control manager 20 or the control agent 14 can predict a risk level of the supervised user based on the change over time of the sentiment of the particular user and restrict use of the user device 12 further based on the predicted risk level.

Figure 6A:
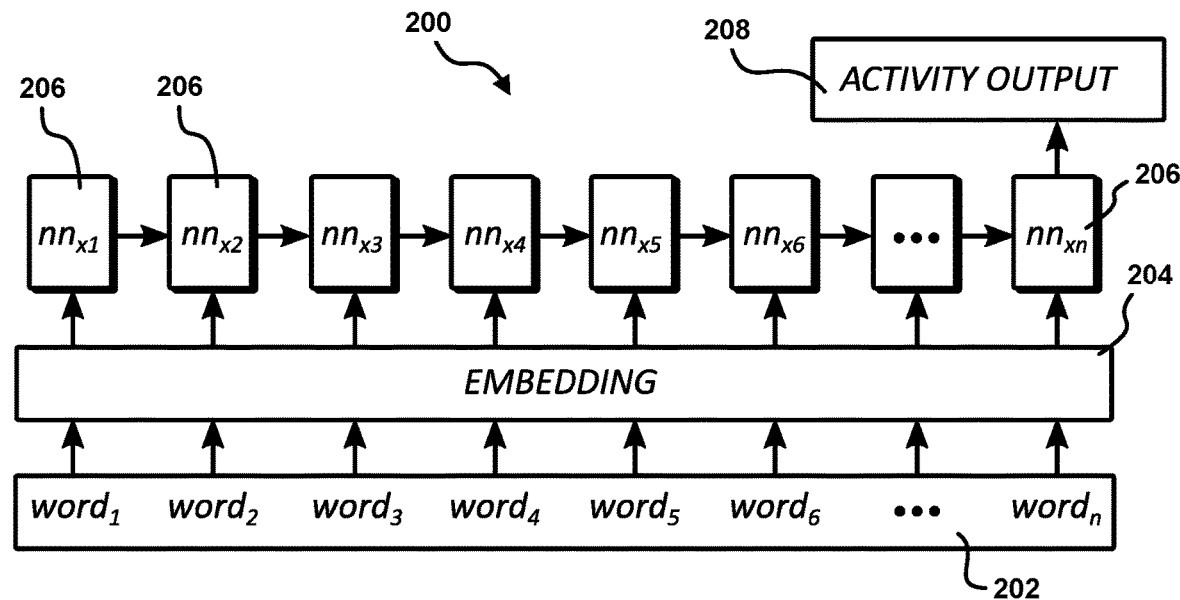
FIG. 6A is a diagram figuratively showing a classifier in the form of an artificial neural network for identifying user activity based on computing device use.

Referring to FIG. 6A, an exemplary classifier in the form of a first recurrent neural network ("RNN") 200 is shown useful for performing herein-described methods. Alternatively, other classifier types can be implemented such as Naïve Bayes, logistic regression, decision tree, boosted tree, support vector machine, convolutional neural network, nearest neighbor, dimensionality reduction algorithm, or gradient boosting algorithm classifiers. The first RNN 200 includes an input layer 202, an embedding layer 204, hidden nodes 206, and an activity output 208. The input layer 202 includes ordered words ($word_1$, $word_2$, . . . $word_n$) used by a supervised user of a user device 12 and others with whom the supervised user performs communication via messaging applications 50, social media applications 52, browsers 54, and gaming applications 57. The first recurrent neural network ("RNN") 200 can be run for example by the classifier engine 22 of the control manager 20 based on monitored data from the control agent 14. The embedding layer 204 creates vector representations of the input words. The hidden nodes 206 sequentially implement neural network algorithms ($nn_{x1}$, $nn_{x2}$, . . . $nn_{xn}$) on vectorized words providing feedback to subsequent nodes 206 to generate the activity output 208. The activity output 208 includes an activity including a topic of conversation in which the supervised user is involved.

Figure 6B:
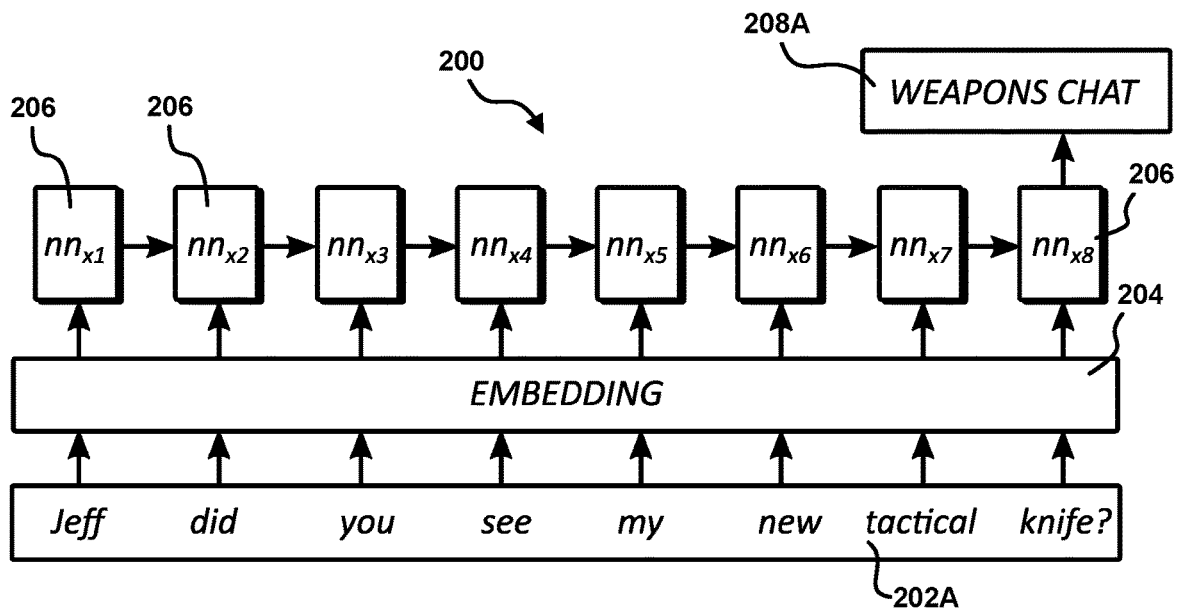
FIG. 6B is a diagram figuratively showing an example implementation of the classifier of FIG. 6A.

Referring to FIG. 6B, an exemplary implementation of the first RNN 200 is shown in which the sentence "Jeff did you see my new tactical knife?" is input as an input layer 202A and the activity output 208A is determined as "weapons chat" by the first RNN 200. The first RNN 200 can be trained automatically for example by designating particular predefined keywords or key phrases as corresponding to a specified activity output, and using the sentences and phrases near in time to the predefined keywords or key phrases as the classifier inputs. For example, a communication in an electronic chat window including the word "gun" can be designated as "weapons chat", and other phrases or sentences near in time to the word "gun" in the chat window can be input to the first RNN 200 to train for the "weapons chat" output 208A.

Figure 7A:
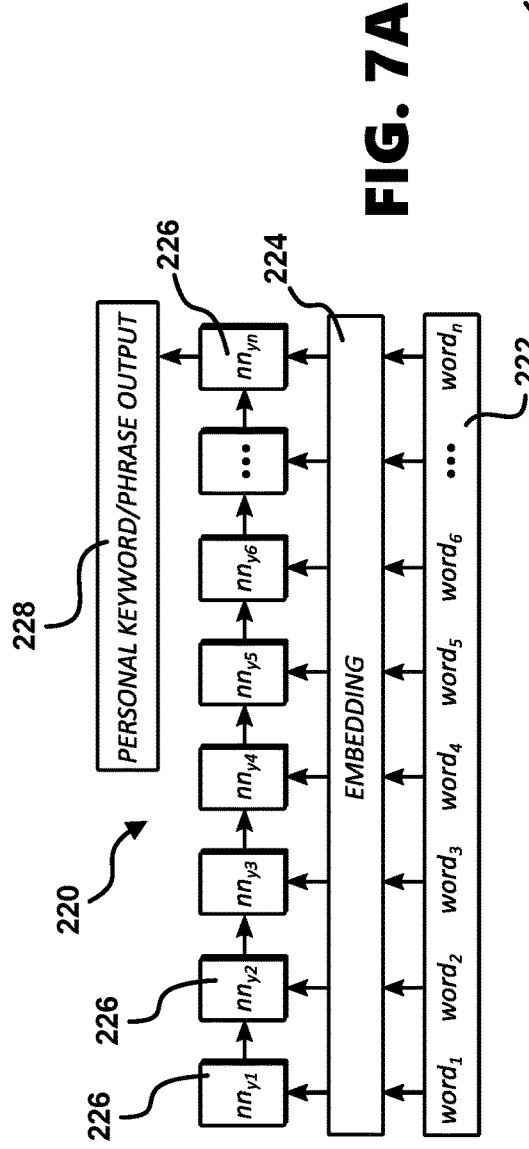
FIG. 7A is a diagram figuratively showing an estimator in the form of an artificial neural network for identifying a personal keyword/key phrase based on computing device use.

Referring to FIG. 7A, an exemplary classifier in the form of a second recurrent neural network ("RNN") 220 is shown useful for performing herein-described methods. Alternatively, other estimator types can be implemented such as linear regression, Naïve Bayes, 1 convolutional neural network, nearest neighbor, or gradient boosting algorithm estimators. The second RNN 220 includes an input layer 222, an embedding layer 224, hidden nodes 226, and a personal keyword/key phrase output 228. The second recurrent neural network ("RNN") 220 can be run for example by the classifier engine 22 of the control manager 20 based on monitored data from the control agent 14. The input layer 222 includes words ($word_1$, $word_2$, . . . $word_n$) used by a supervised user of a user device 12 and others with whom the supervised user performs communication via messaging applications 50, social media applications 52, browsers 54, and gaming applications 57. Beneficially, the ordered words included in the input layer 222 have already been determined by the control manager 20 or the control agent 14 to indicate a particular activity by the first RNN 200, by other algorithm, or by keyword or key phrase matching. The embedding layer 224 creates vector representations of the input words. The hidden nodes 226 sequentially implement neural network algorithms ($nn_{y1}$, $nn_{y2}$, . . . $nn_{yn}$) on vectorized words providing feedback to subsequent nodes 226 to generate the personal keyword/key phrase output 228. The personal keyword/key phrase output 228 includes a word or phrase corresponding to the identified particular activity. The output personal keywords and key phrases are beneficially stored in one or both of the user datastore 26 of the control manager 20 or the control datastore 62 of the user device 12 for use by the control agent 14 in subsequent keyword or key phrase detecting monitoring processes.

Figure 7B:
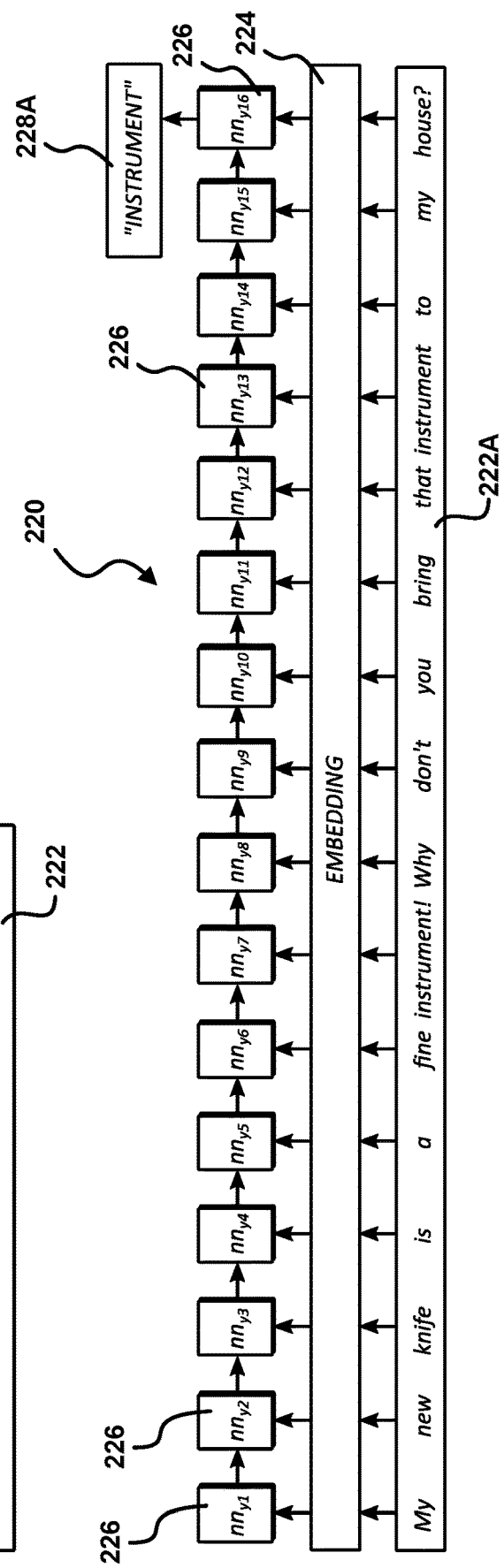
FIG. 7B is a diagram figuratively showing an example implementation of the estimator of FIG. 7A.

Referring to FIG. 7B, an exemplary implementation of the second RNN 220 is shown in which the sentences "My new knife is a fine instrument!" and "Why don't you bring that instrument to my house?" are input as an input layer 222A and the personal keyword/key phrase output is determined as "instrument" by the second RNN 220. The second RNN 220 can be trained automatically for example by designating as the personal keyword/key phrase output 228 a frequently repeated word within a particular number of words from a known keyword or key phrase in the input layer 222. For example, the word "ammo" from an electronic chat communication can be designated as personal keyword/key phrase output 228 based on it being within 5 words from the keyword "gun" and based on "gun" being frequently repeated over a particular time period, and other phrases or sentences near in time to the words "ammo" and "gun" in the chat communication can be input to the second RNN 220 to train for the personal keyword/key phrase output 228.

Figure 8A:
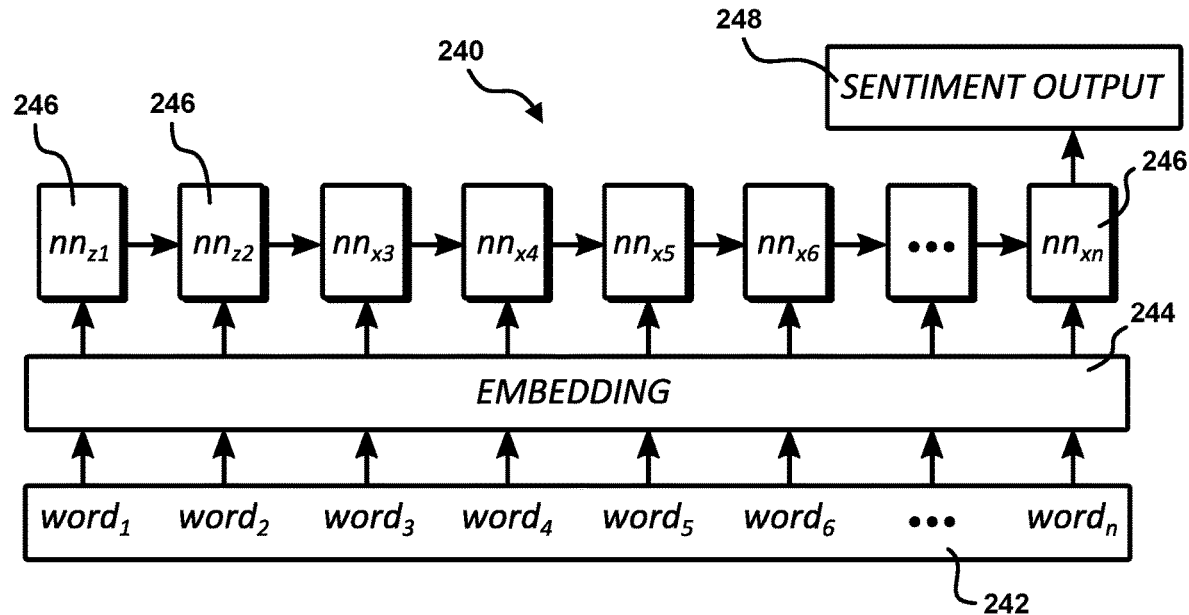
FIG. 8A is a diagram figuratively showing an estimator in the form of an artificial neural network for identifying user sentiment based on computing device use.

Referring to FIG. 8A, an exemplary estimator in the form of a third recurrent neural network ("RNN") 240 is shown useful for performing herein-described methods. Alternatively, other estimator types can be implemented such as linear regression, Naïve Bayes, convolutional neural network, nearest neighbor, or gradient boosting algorithm estimators. The third RNN 240 includes an input layer 242, an embedding layer 244, hidden nodes 246, and a sentiment output 248. The third recurrent neural network ("RNN") 240 can be run for example by the classifier engine 22 of the control manager 20 based on monitored data from the control agent 14. The input layer 242 includes ordered words ($word_1$, $word_2$, . . . $word_n$) used by a supervised user of a user device 12 and others with whom which the supervised user performs communication via messaging applications 50, social media applications 52, browsers 54, and gaming applications 57. The embedding layer 244 creates vector representations of the input words. The hidden nodes 246 sequentially implement neural network algorithms ($nn_{x1}$, $nn_{x2}$, . . . $nn_{xn}$) on vectorized words providing feedback to subsequent nodes 246 to generate the sentiment output 248. The sentiment output 248 includes an indication of the sentiment of a supervised user which can be positive (e.g. "friendly", "supportive", "neutral") or negative (e.g. "offensive", "violent", "sexual", "aggressive", "insulting"). Sentiment outputs can further include magnitude or severity levels of a particular sentiment, for example "aggressive" with intensity of three (3) out of five (5). Aggregating the sentiment outputs 248 over a plurality of communications over a period of time, the aggregation engine 34 determines time distributions of the determined sentiments and any cumulative magnitude or severity levels. For example, the aggregation engine 34 can generate a color coded sentiment summary indicating a supervised user was "friendly 50% of the time", "aggressive 20% of the time at a severity level of 3 out of 5", and "neutral 30% of the time". The aggregation engine 34 can further generate a report estimating suicide risk, violence risk, and lack of social engagement based on the sentiment outputs 248 over a particular period of time and based on pre-defined criteria. Such report can for example be color coded where green represents a low risk, yellow a medium risk, and red a high risk.

Figure 8B:
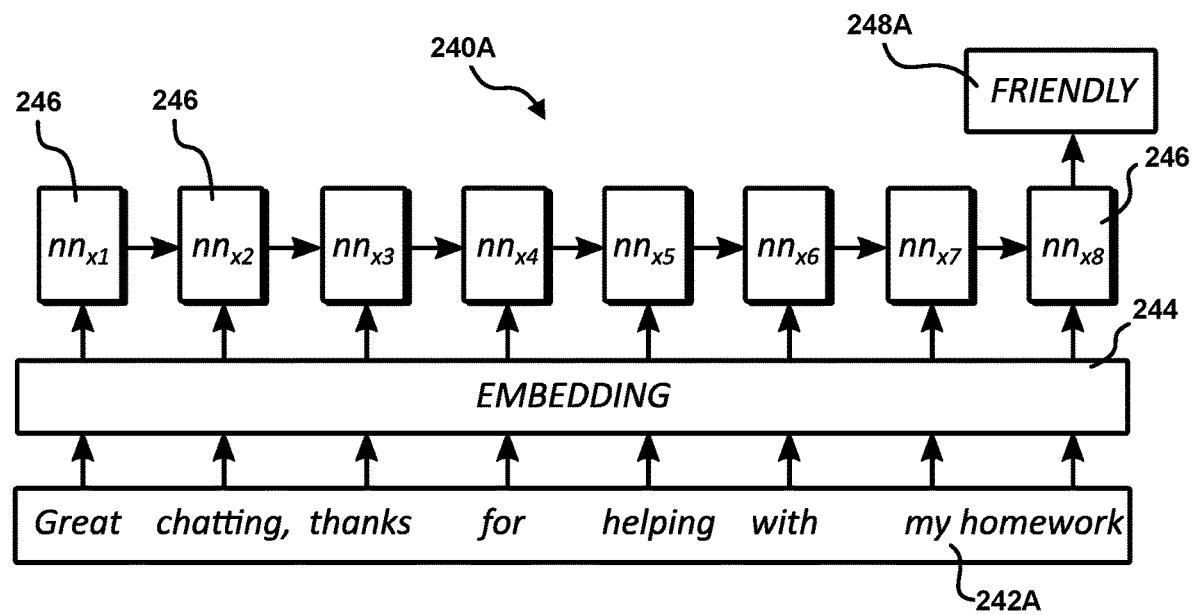
FIG. 8B is a diagram figuratively showing an example implementation of the estimator of FIG. 8A.

Referring to FIG. 8B, an exemplary implementation of the third RNN 240 is shown in which the sentence "Great chatting, thanks for helping with my homework" is input as an input layer 242A and the sentiment output 248A is determined as "friendly" by the third RNN 240. The third RNN 240 can be trained automatically for example by designating particular predefined keywords or key phrases as corresponding to a specified sentiment, and using the sentences and phrases near in time to the predefined keywords or key phrases as the estimator inputs. For example, a communication in an electronic chat window including the phrase "I hate you" can be designated as "aggressive", and other phrases or sentences near in time to the phrase "I hate you" in the chat window can be input to the third RNN 240 to train for the "aggressive" output. The control manager 20 via the aggregation engine 34 determines changes in determined sentiments of a supervised user based on aggregated outputs of the third RNN 240 as applied by the classifier engine 22, and the supervisor application 40 provides reports or alerts to a supervisory user based on significant changes sentiment.

The control manager 20 via the aggregation engine 34 determines increases and decreases in particular activities relative to other activities (i.e. "activity ratios") based on outputs of the first RNN 200 as applied by the classifier engine 22, and the supervisor application 40 provides reports or alerts to a supervisory user based on significant changes in activity ratios. Referring to FIG. 9A, an exemplary plot chart 300 is shown of a supervised user's use time in minutes performing particular activities each day over eight days (January $1^{st}$ through January $8^{th}$), as determined for example based on activities output by the first RNN 200. As depicted in a key 318 of the plot chart 300, determined gaming activity is represented by "X" 302, social chatting is represented by "○" 304, and physical activity is represented by a "●" 306. It is shown by the plot chart 300 that the supervised user's daily gaming activity fluctuates more than his social chatting or his physical activity over the eight day period. The fluctuations are beneficially conveyed in a report or alert to a supervisory user via the supervisor application 40. Further, an adaptive screen time policy is enabled by the control agent 14. For example, the control agent 14 based on settings implemented by a supervisory user blocks or minimizes screen time responsive to determining a negative activity trend (e.g. bullying) and increases screen time responsive to determining a positive trend (e.g. group study). In another implementation the control agent 14 or control manager 20 can determine a change over time of the non-physical activity (e.g. social chatting, gaming activity) relative to the physical activity of the supervised user, and the control agent 14 can restrict the use of the user device 12 based on the determined change over time of the of the non-physical activity relative to the physical activity of the supervised user.

Referring to FIG. 9B, an exemplary estimator in the form of a fourth recurrent neural network ("RNN") 320 is shown useful for performing herein-described methods. Alternatively, other estimator types can be implemented such as linear regression, Naïve Bayes, convolutional neural network, nearest neighbor, or gradient boosting algorithm estimators. The fourth RNN 320 includes use time inputs ($xt_k$, $xt_{k+1}$, ... $xt_{k+n}$) 322, hidden nodes 324, and predicted use time outputs 326. The fourth RNN 320 can be run for example by the classifier engine 22 of the control manager 20 based on monitored data from the control agent 14. The hidden nodes 324 sequentially implement neural network algorithms ($nn_{a1}$, $nn_{a2}$, ... $nn_{an}$, $nn_{a(n+1)}$) on the use time inputs 322 providing feedback to subsequent hidden nodes 324 to generate the predicted use time outputs 326. Predicted use time outputs 326 are fed into subsequent hidden nodes 324 to generate subsequent predicted use time outputs 326. For example, gaming activity plots 302 can be entered as inputs 322 of the fourth RNN 320 to generate predicted outputs 326 as predicted gaming activity use time plots 312 on days January $9^{th}$ and January $10^{th}$ for which actual gaming activity use time is not yet known or available. By the same process, social chatting plots 304 and physical activity plots 306 are entered as inputs 322 to generate predicted outputs 326 as predicted social chatting plots 314 and predicted physical activity plots 316 respectively. The control agent 14 or control manager 20 for example can predict a future change over time of the non-physical activity (e.g. social chatting, gaming activity) relative to the physical activity of the supervised user, and the control agent 14 can restrict the use of the user device 12 based on the predicted future change over time of the of the non-physical activity relative to the physical activity of the supervised user.

FIG. 13 illustrates in abstract the function of an exemplary computer system 1000 on which the systems, methods and processes described herein can execute. For example, the user device 12, router 13, supervisor device 16, control manager 20, and telecom API 80 can each be embodied by a particular computer system 1000. The computer system 1000 may be provided in the form of a personal computer, laptop, handheld mobile communication device, mainframe, distributed computing system, or other suitable configuration. Illustrative subject matter is in some instances described herein as computer-executable instructions, for example in the form of program modules, which program modules can include programs, routines, objects, data structures, components, or architecture configured to perform particular tasks or implement particular abstract data types. The computer-executable instructions are represented for example by instructions 1024 executable by the computer system 1000.

The computer system 1000 can operate as a standalone device or can be connected (e.g., networked) to other machines. In a networked deployment, the computer system 1000 may operate in the capacity of a server or a client machine in server-client network environment, or as a peer machine in a peer-to-peer (or distributed) network environment. The computer system 1000 can also be considered to include a collection of machines that individually or jointly execute a set (or multiple sets) of instructions to perform one or more of the methodologies described herein.

It would be understood by those skilled in the art that other computer systems including but not limited to networkable personal computers, minicomputers, mainframe computers, handheld mobile communication devices, multiprocessor systems, microprocessor-based or programmable electronics, and smart phones could be used to enable the systems, methods and processes described herein. Such computer systems can moreover be configured as distributed computer environments where program modules are enabled and tasks are performed by processing devices linked through a communications network, and in which program modules can be located in both local and remote memory storage devices.

The exemplary computer system 1000 includes a processor 1002, for example a central processing unit (CPU) or a graphics processing unit (GPU), a main memory 1004, and a static memory 1006 in communication via a bus 1008. A visual display 1010 for example a liquid crystal display (LCD), light emitting diode (LED) display or a cathode ray tube (CRT) is provided for displaying data to a user of the computer system 1000. The visual display 1010 can be enabled to receive data input from a user for example via a resistive or capacitive touch screen. A character input apparatus 1012 can be provided for example in the form of a physical keyboard, or alternatively, a program module which enables a user-interactive simulated keyboard on the visual display 1010 and actuatable for example using a resistive or capacitive touchscreen. An audio input apparatus 1013, for example a microphone, enables audible language input which can be converted to textual input by the processor 1002 via the instructions 1024. A pointing/selecting apparatus 1014 can be provided, for example in the form of a computer mouse or enabled via a resistive or capacitive touch screen in the visual display 1010. A data drive 1016, a signal generator 1018 such as an audio speaker, and a network interface 1020 can also be provided. A location determining system 1017 is also provided which can include for example a GPS receiver and supporting hardware.

The instructions 1024 and data structures embodying or used by the herein-described systems, methods, and processes, for example software instructions, are stored on a computer-readable medium 1022 and are accessible via the data drive 1016. Further, the instructions 1024 can completely or partially reside for a particular time period in the main memory 1004 or within the processor 1002 when the instructions 1024 are executed. The main memory 1004 and the processor 1002 are also as such considered computer-readable media.

While the computer-readable medium 1022 is shown as a single medium, the computer-readable medium 1022 can be considered to include a single medium or multiple media, for example in a centralized or distributed database, or associated caches and servers, that store the instructions 1024. The computer-readable medium 1022 can be considered to include any tangible medium that can store, encode, or carry instructions for execution by a machine and that cause the machine to perform any one or more of the methodologies described herein, or that can store, encode, or carry data structures used by or associated with such instructions. Further, the term "computer-readable storage medium" can be considered to include, but is not limited to, solid-state memories and optical and magnetic media that can store information in a non-transitory manner. Computer-readable media can for example include non-volatile memory such as semiconductor memory devices (e.g., magnetic disks such as internal hard disks and removable disks, magneto-optical disks, CD-ROM and DVD-ROM disks, Erasable Programmable Read-Only Memory (EPROM), Electrically Erasable Programmable Read-Only Memory (EEPROM), and flash memory devices).

The instructions 1024 can be transmitted or received over a communications network, for example the communications network 8, using a signal transmission medium via the network interface 1020 operating under one or more known transfer protocols, for example FTP, HTTP, or HTTPs. Examples of communication networks include a local area network (LAN), a wide area network (WAN), the Internet, mobile telephone networks, Plain Old Telephone (POTS) networks, and wireless data networks, for example WiFi™ and 3G/4G/5G cellular networks. The term "computer-readable signal medium" can further be considered to include any transitory intangible medium that is capable of storing, encoding, or carrying instructions for execution by a machine, and includes digital or analog communications signals or other intangible medium to facilitate communication of such instructions.

Although features and elements are described above in particular combinations, one of ordinary skill in the art will appreciate that each feature or element can be used alone or in any combination with the other features and elements. Methods described herein may be implemented in a computer program, software, or firmware incorporated in a computer-readable medium for execution by a computer or processor. While embodiments have been described in detail above, these embodiments are non-limiting and should be considered as merely exemplary. Modifications and extensions may be developed, and all such modifications are deemed to be within the scope defined by the appended claims.

What is claimed is:

1. A method of controlling use of network-connectable devices, the method comprising:
   monitoring by a first computational process, operating at a first processor utilization level, communication on a particular user device operated by a particular user, the communication comprising at least one of audio data or visual data;
   converting the at least one of the audio data or the visual data of the communication into at least one of text or images;
   determining based on the monitoring by the first computational process a trigger event;
   monitoring by a second computational process, operating at a second processor utilization level higher than the first processor utilization level, the communication on the particular user device responsive to determining the trigger event;
   categorizing an activity of the particular user by an analysis of the at least one of the text or the images by the second computational process;
   determining a change over time of the categorized activity of the particular user by the second computational process, the change over time comprising at least one of a quantity or duration of the categorized activity;
   predicting a future state of the categorized activity based on the determined change over time; and
   restricting use of the particular user device based on the predicted future state of the categorized activity.

2. The method of claim 1, wherein predicting the future state of the categorized activity comprises applying a recurrent neural network ("RNN") estimator to the determined change over time.

3. A method of controlling use of network-connectable devices, the method comprising:
   monitoring by a first computational process, operating at a first processor utilization level, communication on a particular user device operated by a particular user;
   determining based on the monitoring by the first computational process a trigger event;

monitoring by a second computational process, operating at a second processor utilization level higher than the first processor utilization level, the communication on the particular user device responsive to determining the trigger event;

determining by the particular user device a frequency of touch screen inputs of the particular user device; and restricting use of the particular user device based at least on the monitoring by the second computational process of the communication and the determining by the particular user device of the frequency of the touch screen inputs.

4. The method of claim 3, further comprising:
determining by the particular user device at least one of sensed light level or screen brightness level of the particular user device; and
restricting the use of the particular user device further based on the determining by the particular user device of the at least one of the sensed light level or the screen brightness level of the particular user device.

5. A method of controlling use of network-connectable devices, the method comprising:
monitoring by a first computational process, operating at a first processor utilization level, communication on a particular user device operated by a particular user;
determining based on the monitoring by the first computational process a trigger event;
monitoring by a second computational process, operating at a second processor utilization level higher than the first processor utilization level, the communication on the particular user device responsive to determining the trigger event;
capturing display screen output of the particular user device;
identifying text in the display screen output;
categorizing the text by at least one of the first computational process or the second computational process; and
restricting use of the particular user device based at least on the monitoring by the second computational process of the communication and the categorizing of the text.

6. A method of controlling use of network-connectable devices, the method comprising:
monitoring by a first computational process, operating at a first processor utilization level, communication on a particular user device operated by a particular user;
determining based on the monitoring by the first computational process a trigger event;
monitoring by a second computational process, operating at a second processor utilization level higher than the first processor utilization level, the communication on the particular user device responsive to determining the trigger event;
extracting at least one of script or an image from a computing system via a network by the particular user device;
identifying text in the at least one of the script or the image from the computing system;
categorizing the text by at least one of the first computational process or the second computational process; and
restricting use of the particular user device based at least on the monitoring by the second computational process of the communication and the categorizing of the text.

7. The method of claim 1, further comprising:
extracting text by at least one of the monitoring by the first computational process or the monitoring by the second computational process;
categorizing the text by at least one of the first computational process or the second computational process;
generating at least one of personal keywords or personal key phrases based on the categorizing; and
determining the trigger event by identifying the at least one of the personal keywords or the personal key phrases by the monitoring by the first computational process.

8. A method of controlling use of network-connectable devices, the method comprising:
monitoring by a first computational process, operating at a first processor utilization level, communication on a particular user device operated by a particular user;
determining based on the monitoring by the first computational process a trigger event;
monitoring by a second computational process, operating at a second processor utilization level higher than the first processor utilization level, the communication on the particular user device responsive to determining the trigger event;
monitoring by at least one of the first computational process or the second computational process communication on a plurality of other user devices operated by the particular user; and
restricting use of the particular user device based at least on the monitoring by the second computational process of the communication on the particular user device and on the monitoring of the communication on the plurality of the other user devices operated by the particular user.

9. The method of claim 8, the monitoring by the first computational process comprising monitoring by a continuous and real time process, and the monitoring by the second computational process comprising at least one of monitoring periodically for a particular time period or monitoring periodically particular batches of data.

10. The method of claim 1, further comprising:
receiving at least one criterion from a party;
monitoring the communication by at least one of the first computational process or the second computational process based on the at least one criterion from the party;
restricting the use of the particular user device further based on the at least one criterion from the party; and
notifying the party based on the monitoring by the at least one of the first computational process or the second computational process based on the at least one criterion from the party.

11. The method of claim 1, further comprising
converting the at least one of the audio data or the visual data of the communication into the text;
categorizing at least one of the activity or a sentiment of the particular user by an analysis of the text by the second computational process; and
notifying a party of the categorizing of the at least one of the activity or the sentiment of the particular user.

12. The method of claim 1, further comprising
converting the at least one of the audio data or the visual data of the communication into the text;
categorizing the activity of the particular user by an analysis of the text by the second computational process; and notifying a party of the determined change over time of the categorized activity.

13. A method of controlling use of network-connectable devices, the method comprising:
monitoring by a first computational process, operating at a first processor utilization level, communication on a particular user device operated by a particular user, the monitoring by the first computational process comprising capturing first display output at a first resolution and performing image determining analysis on the first display output to determine a trigger event;
monitoring by a second computational process operating at a second processor utilization level higher than the first processor utilization level the communication on the particular user device responsive to determining the trigger event, the monitoring by the second computational process comprising capturing second display output at a second resolution higher than the first resolution and performing image determining analysis on the second display output to determine a particular image; and
restricting use of the particular user device based at least on the determined particular image.

14. A method of controlling use of network-connectable devices, the method comprising:
monitoring by a first computational process, operating at a first processor utilization level, communication on a particular user device operated by a particular user, the monitoring by the first computational process comprising capturing first video output at a first frequency and performing image determining analysis on the first video output to determine a trigger event;
monitoring by a second computational process, operating at a second processor utilization level higher than the first processor utilization level, the communication on the particular user device responsive to determining the trigger event, the monitoring by the second computational process comprising capturing second video output at a second frequency higher than the first frequency and performing image determining analysis on the second video output to determine a particular image; and
restricting use of the particular user device based at least on the determined particular image.

15. The method of claim 1, the monitoring of the communication comprising monitoring at least one of a telephone call, a video call, an electronic message or a website interaction.

16. A method of controlling use of network-connectable devices, the method comprising:
monitoring usage of a particular user of a particular user device, the usage comprising communication;
capturing display screen output of the particular user device;
applying a classifier to the display screen output to determine a particular image;
categorizing activities of the particular user as at least one of academic activities or social activities based on the determining of the particular image;
determining a change over time of the categorized activities of the particular user; and
restricting use of the particular user device at least based on the determined change over time of the categorized activities.

17. A method of controlling use of network-connectable devices, the method comprising:
monitoring usage of a particular user of a particular user device, the usage comprising communication;
capturing display screen output of the particular user device, the display screen output comprising at least one of text or images;
analyzing the at least one of the text or the images and categorizing activities in real time by a first computational process operating at a first processor utilization level; and
analyzing the at least one of the text or the images and categorizing the activities on a periodic basis by a second computational process operating at a second processor utilization level higher than the first processor utilization level;
applying a classifier to the display screen output to determine a particular image;
categorizing the activities of the particular user based on the determining of the particular image;
determining a change over time of the categorized activities of the particular user; and
restricting use of the particular user device at least based on the determined change over time of the categorized activities.

18. The method of claim 17, the monitoring of the usage comprising monitoring at least one of a telephone call, a video call, an electronic message, game play, or a website interaction.

19. The method of claim 17, further comprising:
generating a report of the categorizing of the activities; and
transmitting the report to a party.

20. A method of controlling use of network-connectable devices, the method comprising:
monitoring usage of a particular user of a particular user device, the usage comprising communication;
capturing display screen output of the particular user device;
applying a classifier to the display screen output to determine a particular image;
categorizing activities of the particular user based on the determining of the particular image;
determining a change over time of the categorized activities of the particular user;
determining a change over time of a particular categorized activity of the categorized activities relative to a total of the categorized activities; and
restricting use of the particular user device based on the determined change over time of the particular categorized activity of the categorized activities relative to the total of the categorized activities.

21. A method of controlling use of network-connectable devices, the method comprising:
monitoring usage of a particular user of a particular user device, the usage comprising communication;
capturing display screen output of the particular user device;
applying a classifier to the display screen output to determine a particular image;
categorizing activities of the particular user based on the determining of the particular image;
determining a change over time of the categorized activities of the particular user;
predicting a future state of the categorized activities based on the determined change over time; and
restricting use of the particular user device further based on the predicted future state of the categorized activities.

22. A method of controlling use of network-connectable devices, the method comprising:
monitoring usage of a particular user of a particular user device, the usage comprising communication;
capturing display screen output of the particular user device, the display screen output comprising text;
applying a classifier to the display screen output to determine a particular image;
categorizing activities of the particular user based on the determining of the particular image;
determining a change over time of the categorized activities of the particular user;
determining a sentiment of the particular user by an analysis of the text;
determining a change over time of the sentiment of the particular user; and
restricting use of the particular user device based on the determined change over time of the categorized activities and based on the determined change over time of the sentiment.

23. A method of controlling use of network-connectable devices, the method comprising:
monitoring usage of a particular user of a particular user device, the usage comprising communication;
capturing display screen output of the particular user device, the display screen output comprising text;
applying a classifier to the display screen output to determine a particular image;
categorizing activities of the particular user based on the determining of the particular image;
determining a change over time of the categorized activities of the particular user;
determining a sentiment of the particular user by an analysis of the text;
determining a change over time of the sentiment of the particular user;
predicting a risk level of the particular user at least based on the change over time of the sentiment of the particular user; and
restricting use of the particular user device based on the determined change over time of the categorized activities and based on the predicted risk level.

24. A method of controlling use of network-connectable devices, the method comprising:
monitoring usage of a particular user of a particular user device, the usage comprising communication,
capturing display screen output of the particular user device;
applying a classifier to the display screen output to determine a particular image;
categorizing activities of the particular user based on the determining of the particular image;
determining a change over time of the categorized activities of the particular user, the change over time of the categorized activities comprising a first change over time of the categorized activities and a second change over time of the categorized activities after the first change over time;
generating a notification on the particular user device responsive to the first change over time of the categorized activities; and
restricting use of the particular user device based on the second change over time of the categorized activities.

25. A method of controlling use of network-connectable devices, the method comprising:
monitoring usage of a particular user of a particular user device, the usage comprising communication;
determining by the particular user device at least one of acceleration of the particular user device or location of the particular user device;
determining physical activity of the particular user based on the at least one of the acceleration of the particular user device or the location of the particular user device;
determining non-physical activity based on the monitoring of the usage of the particular user of the particular user device;
determining a change over time of the non-physical activity relative to the physical activity of the particular user;
restricting use of the particular user device based on the determined change over time of the of the non-physical activity relative to the physical activity of the particular user;
predicting a future change over time of the non-physical activity relative to the physical activity of the particular user by application of a machine learning estimator; and
restricting the use of the particular user device based on the predicted future change over time of the of the non-physical activity relative to the physical activity of the particular user.

26. The method of claim 1, further comprising restricting the use of the particular user device further based on the monitoring by the first computational process of the communication.

27. The method of claim 1, further comprising: converting the at least one of the audio data or the visual data of the communication into the text, and
conducting natural language processing on the text by the second computational process to categorize the text; and
restricting the use of the particular user device further based at least on the categorizing of the text.

28. The method of claim 1, further comprising:
converting the at least one of the audio data or the visual data of the communication into the text; and
categorizing the activity of the particular user by an analysis of the text by the second computational process.

29. The method of claim 1, further comprising:
converting the at least one of the audio data or the visual data of the communication into the text;
categorizing the activity of the particular user by an analysis of the text by the second computational process; and
enabling the use of a particular functional component of the particular user device based on the determined change over time of the categorized activity.

30. The method of claim 5, further comprising:
categorizing a plurality of activities of the particular user by an analysis of the text by the second computational process;
determining a change over time of a particular activity of the plurality of activities relative to a total of the plurality of activities of the particular user by the second computational process; and
restricting the use of the particular user device based on the determined change over time of the particular activity of the plurality of activities relative to the total of the plurality of activities of the particular use.

31. The method of claim 5, further comprising: determining a sentiment of the particular user by' an analysis of the text by the second computational process;

determining a change over time of the sentiment of the particular user by the second computational process; and restricting the use of the particular user device based on the determined change over time of the sentiment.

32. The method of claim 5, further comprising:

determining by the particular user device acceleration of the particular user device; and restricting the use of the particular user device further based on the determining by the particular user device acceleration of the particular user device.

33. The method of claim 5, further comprising analysing the text;

determining by the particular user device at least one of acceleration of the particular user device or location of the particular user device;

categorizing an activity of the particular user based on the analyzing of the text and based on the determining of the at least one of the acceleration of the particular user device or the location of the particular user device;

determining a change over time of the categorized activity of the particular user;

and restricting the use of the particular user device based on the determined change over time of the categorized activity.

34. The method of claim 5, further comprising: comparing by the first computational process the text with at least one of a keyword list or a key phrase list;

wherein the determining of the trigger event comprises detecting at least one of a particular keyword or a particular key phrase in the text.

* * * * *

UNITED STATES PATENT AND TRADEMARK OFFICE
CERTIFICATE OF CORRECTION

PATENT NO. : 10,965,802 B2
APPLICATION NO. : 16/446105
DATED : March 30, 2021
INVENTOR(S) : Do et al.

It is certified that error appears in the above-identified patent and that said Letters Patent is hereby corrected as shown below:

In the Claims

At Claim 30, Column 28, Line 64, delete "use" after the word "particular" and insert therefor --user--.

At Claim 31, Column 28, Line 66, delete the word "by'" after the word "user" insert therefor --by--.

At Claim 33, Column 29, Line 14, delete the word "analysing" after the word "comprising" and insert therefor --analyzing--.

Signed and Sealed this
Eleventh Day of October, 2022

Katherine Kelly Vidal
*Director of the United States Patent and Trademark Office*